United States Patent
Henry et al.

(10) Patent No.: US 8,683,225 B2
(45) Date of Patent: *Mar. 25, 2014

(54) MICROPROCESSOR THAT FACILITATES TASK SWITCHING BETWEEN ENCRYPTED AND UNENCRYPTED PROGRAMS

(75) Inventors: G. Glenn Henry, Austin, TX (US); Terry Parks, Austin, TX (US); Brent Bean, Austin, TX (US); Thomas A. Crispin, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 274 days.

This patent is subject to a terminal disclaimer.

(21) Appl. No.: 13/091,698

(22) Filed: Apr. 21, 2011

(65) Prior Publication Data
US 2011/0296204 A1    Dec. 1, 2011

Related U.S. Application Data

(60) Provisional application No. 61/348,127, filed on May 25, 2010.

(51) Int. Cl.
*G06F 21/00*    (2013.01)
(52) U.S. Cl.
USPC ............ 713/190; 380/28; 380/43; 380/44; 380/45; 380/46; 726/22; 455/418; 713/189
(58) Field of Classification Search
USPC ........................................................ 713/190
See application file for complete search history.

(56) References Cited

U.S. PATENT DOCUMENTS

| | | | |
|---|---|---|---|
| 4,737,975 A | 4/1988 | Shafer | |
| 5,353,421 A | 10/1994 | Emma et al. | |
| 5,642,500 A | 6/1997 | Inoue | |
| 5,864,697 A | 1/1999 | Shiell | |
| 6,118,870 A | 9/2000 | Boyle et al. | |
| 6,336,178 B1 * | 1/2002 | Favor | 712/23 |
| 6,453,278 B1 | 9/2002 | Favor et al. | |
| 6,674,536 B2 * | 1/2004 | Long et al. | 358/1.15 |
| 6,704,871 B1 * | 3/2004 | Kaplan et al. | 713/192 |
| 6,707,463 B1 * | 3/2004 | Gibson et al. | 345/619 |

(Continued)

OTHER PUBLICATIONS

Evaluating MapReduce for Multi-core and Multiprocessor Systems|http://pages.cs.wisc.edu/~david/courses/cs758/Fall2009/papers/mapreduce.pdf|Ranger et al.|2007|pp. 1-12.*

(Continued)

*Primary Examiner* — Mahfuzur Rahman
(74) *Attorney, Agent, or Firm* — E. Alan Davis; James W. Huffman

(57) ABSTRACT

A microprocessor includes an architected register having a bit (may be x86 EFLAGS register reserved bit) set by the microprocessor. A fetch unit fetches encrypted instructions from an instruction cache and decrypts them (via XOR) prior to executing them, in response to the microprocessor setting the bit. The microprocessor saves the bit value to a stack in memory and then clears the bit in response to receiving an interrupt. The fetch unit fetches unencrypted instructions from the instruction cache and executes them without decrypting them after the microprocessor clears the bit. The microprocessor restores the saved value from the stack in memory to the bit in the architected register (and in one embodiment, also restores decryption key values) in response to executing a return from interrupt instruction. The fetch unit resumes fetching and decrypting the encrypted instructions in response to determining that the restored value of the bit is set.

10 Claims, 15 Drawing Sheets

(56) References Cited

U.S. PATENT DOCUMENTS

| | | | |
|---|---|---|---|
| 6,996,725 | B2 | 2/2006 | Ma et al. |
| 7,036,003 | B1 | 4/2006 | Sunayama et al. |
| 7,130,951 | B1 | 10/2006 | Christie et al. |
| 7,260,217 | B1 | 8/2007 | Carlson |
| 7,321,910 | B2 | 1/2008 | Crispin et al. |
| 7,447,882 | B2 | 11/2008 | Elwood |
| 7,451,327 | B2 | 11/2008 | DaCosta |
| 7,472,263 | B2 | 12/2008 | Yokoi |
| 7,529,368 | B2 | 5/2009 | Henry et al. |
| 7,532,722 | B2 | 5/2009 | Crispin et al. |
| 7,590,869 | B2 | 9/2009 | Hashimoto |
| 7,694,151 | B1 | 4/2010 | Johnson et al. |
| 7,844,053 | B2 | 11/2010 | Crispin et al. |
| 7,853,778 | B2 | 12/2010 | Roussel |
| 7,865,733 | B2 | 1/2011 | Goto et al. |
| 7,900,055 | B2 | 3/2011 | Henry et al. |
| 7,996,685 | B2 | 8/2011 | Jin et al. |
| 8,135,962 | B2 * | 3/2012 | Strongin et al. ............... 713/190 |
| 8,468,364 | B2 * | 6/2013 | Goto ............................ 713/187 |
| 2002/0101995 | A1 * | 8/2002 | Hashimoto et al. ........... 380/277 |
| 2003/0046563 | A1 | 3/2003 | Ma et al. |
| 2003/0149869 | A1 | 8/2003 | Gleichauf |
| 2004/0250090 | A1 | 12/2004 | Crispin et al. |
| 2005/0166069 | A1 | 7/2005 | Hashimoto et al. |
| 2006/0015748 | A1 | 1/2006 | Goto et al. |
| 2006/0041747 | A1 | 2/2006 | Okumura et al. |
| 2006/0136715 | A1 | 6/2006 | Han et al. |
| 2006/0239453 | A1 | 10/2006 | Halpern |
| 2006/0242391 | A1 | 10/2006 | Elwood |
| 2008/0019504 | A1 | 1/2008 | Han et al. |
| 2008/0091920 | A1 | 4/2008 | Shaw et al. |
| 2009/0217017 | A1 | 8/2009 | Alexander et al. |
| 2010/0017625 | A1 | 1/2010 | Johnson et al. |
| 2011/0047361 | A1 | 2/2011 | Roussel |
| 2011/0167243 | A1 | 7/2011 | Yip et al. |
| 2011/0214016 | A1 | 9/2011 | Gschwind |

OTHER PUBLICATIONS

Boneh, Dan et al. "Hardware Support for Tamper-Resistant and Copy-Resistant Software." Nov. 14, 1999. pp. 1-13. Downloaded Mar. 24, 2010 at ftp://db.stanford.edu/pub/cstr/reports/cs/tn/00/97/CS-TN-00-97.pdf.

KC, Gaurav S. et al. "Countering Code-Injection Attacks with Instruction-Set Randomization." 2003. pp. 1-10. Downloaded Mar. 24, 2010 at http://www.prevelakis.net/Papers/instructionrandomization.pdf.

ASICS ws Product Overview. "16 Bit RISC DSP IP Core." pp. 1-2. Downloaded Mar. 24, 2010 at http://www.asics.we/doc/rdsp_brief.pdf.

Sovarel, Ana Nora et al. "Where's the FEEB? The Effectiveness of Instruction Set Randomization." pp. 1-16. Downloaded Mar. 24, 2010 at http://www.cs.virginia.edu/feeb/usenix05.pdf.

Barrantes, Elena Gabriela et al. "Randomized Instruction Set Emulation to Disrupt Binary Code Injection Attacks." CCS '03, Oct. 27-30, 2003, Washington, DC, USA. Http://www.cs.columbia.edu/~locasto/projects/candidacy/papers/barrantes2003randomized.pdf|Barrantes et al. pp. 1-10.

Yang, Jun et al. "Improving Memory Encryption Performance in Secure Processors." IEEE Transactions on Computers, vol. 54, No. 5, May 2005 pp. 630-640.

Song et al. "The PowerPC 604 RISC Microprocessor." downloaded from http://users.ece.gatech.edu/~scotty/7102/PPC604.pdf Oct. 1994, pp. 8-17.

Duvvuru, Sreeram et al. "Evaluation of a Branch Target Address Cache." Proceedings of the 28th Hawaii International Conference on System Sciences. 1995. pp. 173-180.

Rosati, Tony. "A High Speed Data Encryption Processor for Public Key Cryptography." IEEE 1989 Custom Integrated Circuits Conference. Http://ieeexplore.ieee.org/stamp.jsp?tp=&arnumber=5726207 pp. 12/3/1-12.3.5.

* cited by examiner

EFLAGS REGISTER

LOAD KEY INSTRUCTION

SWITCH KEY INSTRUCTION

*FIG. 9*

BRANCH AND SWITCH KEY INSTRUCTION

| OPCODE 902 | KEY REGISTER FILE INDEX 904 | BRANCH INFO 906 |

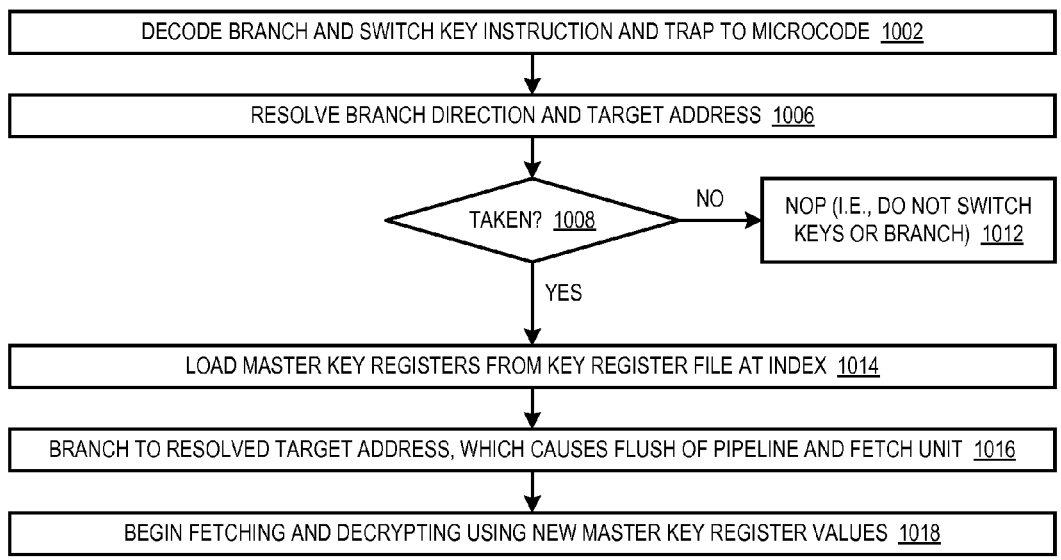

DECODE BRANCH AND SWITCH KEY INSTRUCTION AND TRAP TO MICROCODE 1002

↓

RESOLVE BRANCH DIRECTION AND TARGET ADDRESS 1006

↓

TAKEN? 1008 — NO → NOP (I.E., DO NOT SWITCH KEYS OR BRANCH) 1012

YES ↓

LOAD MASTER KEY REGISTERS FROM KEY REGISTER FILE AT INDEX 1014

↓

BRANCH TO RESOLVED TARGET ADDRESS, WHICH CAUSES FLUSH OF PIPELINE AND FETCH UNIT 1016

↓

BEGIN FETCHING AND DECRYPTING USING NEW MASTER KEY REGISTER VALUES 1018

*FIG. 11*

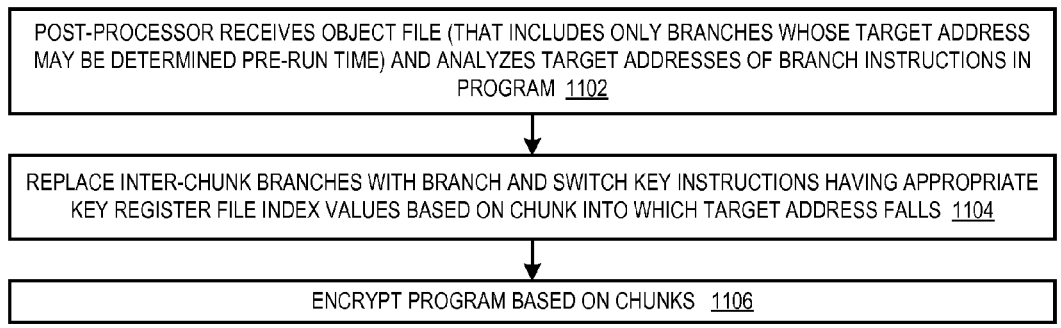

POST-PROCESSOR RECEIVES OBJECT FILE (THAT INCLUDES ONLY BRANCHES WHOSE TARGET ADDRESS MAY BE DETERMINED PRE-RUN TIME) AND ANALYZES TARGET ADDRESSES OF BRANCH INSTRUCTIONS IN PROGRAM 1102

↓

REPLACE INTER-CHUNK BRANCHES WITH BRANCH AND SWITCH KEY INSTRUCTIONS HAVING APPROPRIATE KEY REGISTER FILE INDEX VALUES BASED ON CHUNK INTO WHICH TARGET ADDRESS FALLS 1104

↓

ENCRYPT PROGRAM BASED ON CHUNKS 1106

*FIG. 12*
BRANCH AND SWITCH KEY INSTRUCTION
(ALTERNATE EMBODIMENT)
| OPCODE 1202 | BRANCH INFO 906 |
*FIG. 13*
| 0 | ADDRESS RANGE 1302 | KEY REGISTER FILE INDEX 1304 |
| 1 | ADDRESS RANGE 1302 | KEY REGISTER FILE INDEX 1304 |
| 2 | ADDRESS RANGE 1302 | KEY REGISTER FILE INDEX 1304 |
| ... | ADDRESS RANGE 1302 | KEY REGISTER FILE INDEX 1304 |
| N-1 | ADDRESS RANGE 1302 | KEY REGISTER FILE INDEX 1304 |
*FIG. 14*
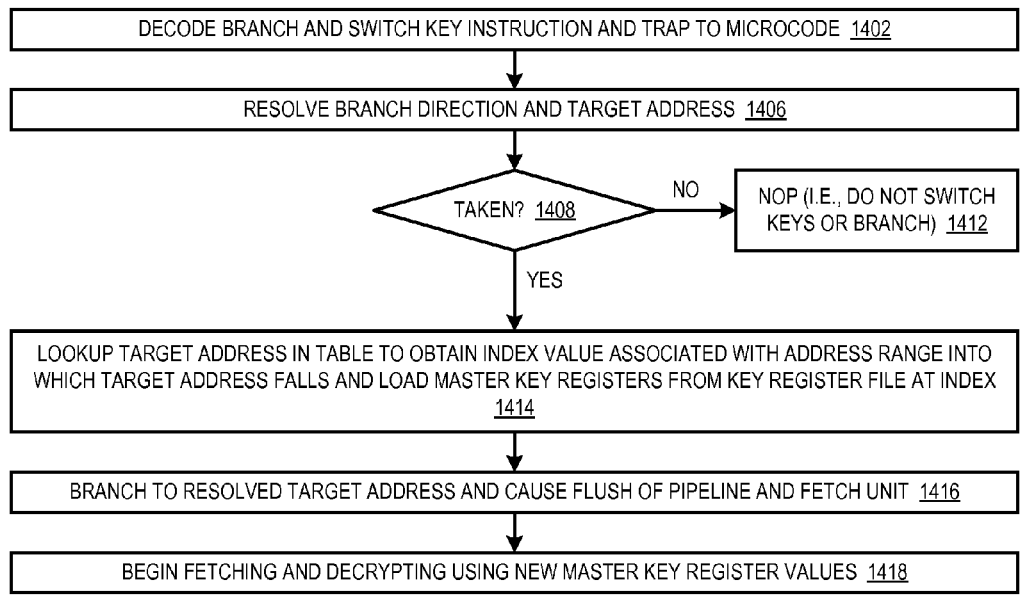

FIG. 15
BRANCH AND SWITCH KEY INSTRUCTION
(ALTERNATE EMBODIMENT)
| OPCODE 1502 | BRANCH INFO 906 |
1500
FIG. 16
1600
| 0 | ADDRESS RANGE 1302 | SMA ADDR 1604 |
| 1 | ADDRESS RANGE 1302 | SMA ADDR 1604 |
| 2 | ADDRESS RANGE 1302 | SMA ADDR 1604 |
| ... | ADDRESS RANGE 1302 | SMA ADDR 1604 |
| N-1 | ADDRESS RANGE 1302 | SMA ADDR 1604 |
FIG. 17
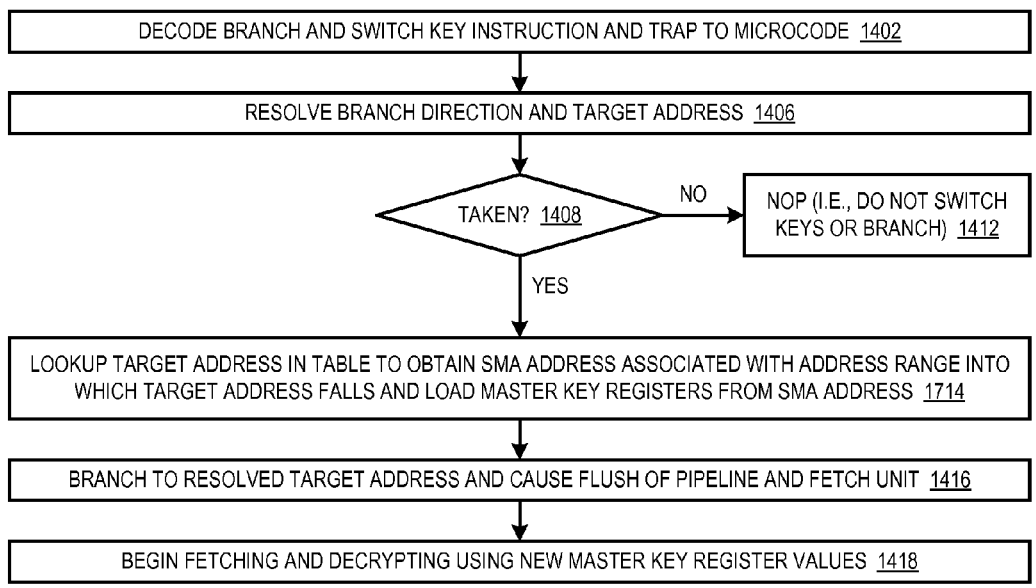

EFLAGS REGISTER 128

MICROPROCESSOR THAT FACILITATES TASK SWITCHING BETWEEN ENCRYPTED AND UNENCRYPTED PROGRAMS

CROSS REFERENCE TO RELATED APPLICATION(S)

This application claims priority based on U.S. Provisional Application Ser. No. 61/348,127, filed May 25, 2010, entitled MICROPROCESSOR THAT FETCHES AND DECRYPTS ENCRYPTED INSTRUCTIONS IN SAME TIME AS PLAIN TEXT INSTRUCTIONS, which is hereby incorporated by reference in its entirety.

This application is related to the following co-pending U.S. patent applications which are concurrently filed herewith, each of which is incorporated by reference herein for all purposes.

| Ser. No. | Filing Date | Title |
| --- | --- | --- |
| TBD (CNTR.2449) | herewith | MICROPROCESSOR THAT FETCHES AND DECRYPTS ENCRYPTED INSTRUCTIONS IN SAME TIME AS PLAIN TEXT INSTRUCTIONS |
| TBD (CNTR.2465) | herewith | SWITCH KEY INSTRUCTION IN A MICROPROCESSOR THAT FETCHES AND DECRYPTS ENCRYPTED INSTRUCTIONS |
| TBD (CNTR.2487) | herewith | BRANCH AND SWITCH KEY INSTRUCTION IN A MICROPROCESSOR THAT FETCHES AND DECRYPTS ENCRYPTED INSTRUCTIONS |
| TBD (CNTR.2489) | herewith | MICROPROCESSOR THAT FACILITATES TASK SWITCHING BETWEEN MULTIPLE ENCRYPTED PROGRAMS HAVING DIFFERENT ASSOCIATED DECRYPTION KEY VALUES |
| TBD (CNTR.2523) | herewith | BRANCH TARGET ADDRESS CACHE FOR PREDICTING INSTRUCTION DECRYPTION KEYS IN A MICROPROCESSOR THAT FETCHES AND DECRYPTS ENCRYPTED INSTRUCTIONS |

FIELD OF THE INVENTION

The present invention relates in general to the field of microprocessors, and particularly to increasing the security of programs executing thereon.

BACKGROUND OF THE INVENTION

It is well known that many software programs are vulnerable to attacks that breach the security of a computer system. For example, an attacker may attempt to exploit a buffer overflow vulnerability of a running program to inject code and cause a transfer of control to the injected code, in which case the injected code has the privileges of the attacked program. One attempt to preventing attacks on software programs is broadly referred to as instruction set randomization. Broadly speaking, instruction set randomization involves encrypting the program in some fashion and then decrypting it within the processor after the processor fetches the program from memory. In this way, the attacker's task of injecting instructions is made more difficult because the injected instructions must be properly encrypted (e.g., using the same encryption key and algorithm as the program under attack) in order to correctly execute. See for example, *Counter Code-Injection Attacks with Instruction-Set Randomization*, by Gaurav S. Kc, Angelos D. Keromytis, and Vassilis Prevelakis, CCS '03, Oct. 27-30, 2003, Washington, D.C., USA, ACM 1-58113-738-9/03/0010, which describes a modified version of the bochs-x86 Pentium emulator. Others have pointed out deficiencies of the approach. See for example, *Where's the FEEB? The Effectiveness of Instruction Set Randomization*, by Ana Nora Sovarel, David Evans, and Nathanael Paul, http://www.cs.virginia.edu/feeb.

BRIEF SUMMARY OF INVENTION

In one aspect the present invention provides a microprocessor. The microprocessor includes an architected register having a bit. The microprocessor is configured to set the bit. The microprocessor also includes a fetch unit, configured to fetch encrypted instructions from an instruction cache and decrypt them prior to executing them, in response to the microprocessor setting the bit. The microprocessor is configured to save the value of the bit to a stack in memory and then clear the bit, in response to receiving an interrupt. The fetch unit is configured to fetch unencrypted instructions from the instruction cache and execute them without decrypting them, after the microprocessor clears the bit. The microprocessor is configured to restore the saved value from the stack in memory to the bit in the architected register, in response to executing a return from interrupt instruction. The fetch unit is configured to resume fetching and decrypting the encrypted instructions, in response to determining that the restored value of the bit is set.

In another aspect, the present invention provides a method for operating a microprocessor having an instruction cache and an architected register. The method includes setting a bit in the architected register and then fetching encrypted instructions from the instruction cache and decrypting them prior to executing them. The method also includes saving the value of the bit in the architected register and then clearing the bit, in response to receiving an interrupt. The method also includes fetching unencrypted instructions from the instruction cache and executing them without decrypting them, after clearing the bit. The method also includes restoring the saved value to the bit in the architected register, in response to executing a return from interrupt instruction. The method also includes resuming the fetching and decrypting and executing the encrypted instructions, in response to determining that the restored value of the bit is set.

In yet another aspect, the present invention provides a microprocessor. The microprocessor includes an architected register having a bit and a fetch unit. The microprocessor is configured to save a value of the bit, in response to receiving a request to interrupt a currently executing program. The bit indicates whether the currently executing program is encrypted or unencrypted. The microprocessor is further configured to restore the saved value to the bit and to resume fetching the interrupted program as the currently executing program, in response to executing a return from interrupt instruction. If the restored value of the bit is set, the microprocessor is configured to restore the decryption key values associated with the currently executing program, prior to resuming fetching the interrupted program, and to decrypt fetched instructions thereof using the restored decryption key values. If the restored value of the bit is clear, the microprocessor is configured to refrain from restoring decryption key values and from decrypting the fetched instructions of the currently executing program.

In yet another aspect, the present invention provides a method for operating a microprocessor. The method includes saving a value of a bit of the microprocessor, in response to receiving a request to interrupt a currently executing program. The bit indicates whether the currently executing program is encrypted or unencrypted. The method also includes, in response to executing a return from interrupt instruction, restoring the saved value to the bit and resuming fetching the interrupted program as the currently executing program. The method also includes, if the restored value of the bit is set, restoring decryption key values associated with the currently executing program, prior to the resuming fetching the interrupted program, and decrypting fetched instructions thereof using the restored decryption key values. The method also includes, if the restored value of the bit is clear, refraining from restoring decryption key values and from decrypting the fetched instructions of the currently executing program.

BRIEF DESCRIPTION OF THE DRAWINGS

FIG. 9 is a block diagram illustrating the format of a branch and switch key instruction according to the present invention.

FIG. 10 is a flowchart illustrating operation of the microprocessor of FIG. 1 to perform the branch and switch key instruction of FIG. 9 according to the present invention.

FIG. 11 is a flowchart illustrating operation of a post-processor, which is a software utility that may be employed to post-process a program and encrypt it for execution by the microprocessor of FIG. 1 according to the present invention.

FIG. 12 is a block diagram illustrating the format of a branch and switch key instruction according to an alternate embodiment of the present invention.

FIG. 13 is a block diagram illustrating a chunk address range table according to the present invention.

FIG. 14 is a flowchart illustrating operation of the microprocessor of FIG. 1 to perform the branch and switch key instruction of FIG. 12 according to the present invention.

FIG. 15 is a block diagram illustrating the format of a branch and switch key instruction according to an alternate embodiment of the present invention.

FIG. 16 is a block diagram illustrating a chunk address range table according to the present invention.

FIG. 17 is a flowchart illustrating operation of the microprocessor of FIG. 1 to perform the branch and switch key instruction of FIG. 15 according to the present invention.

DETAILED DESCRIPTION OF THE INVENTION

Figure 1:
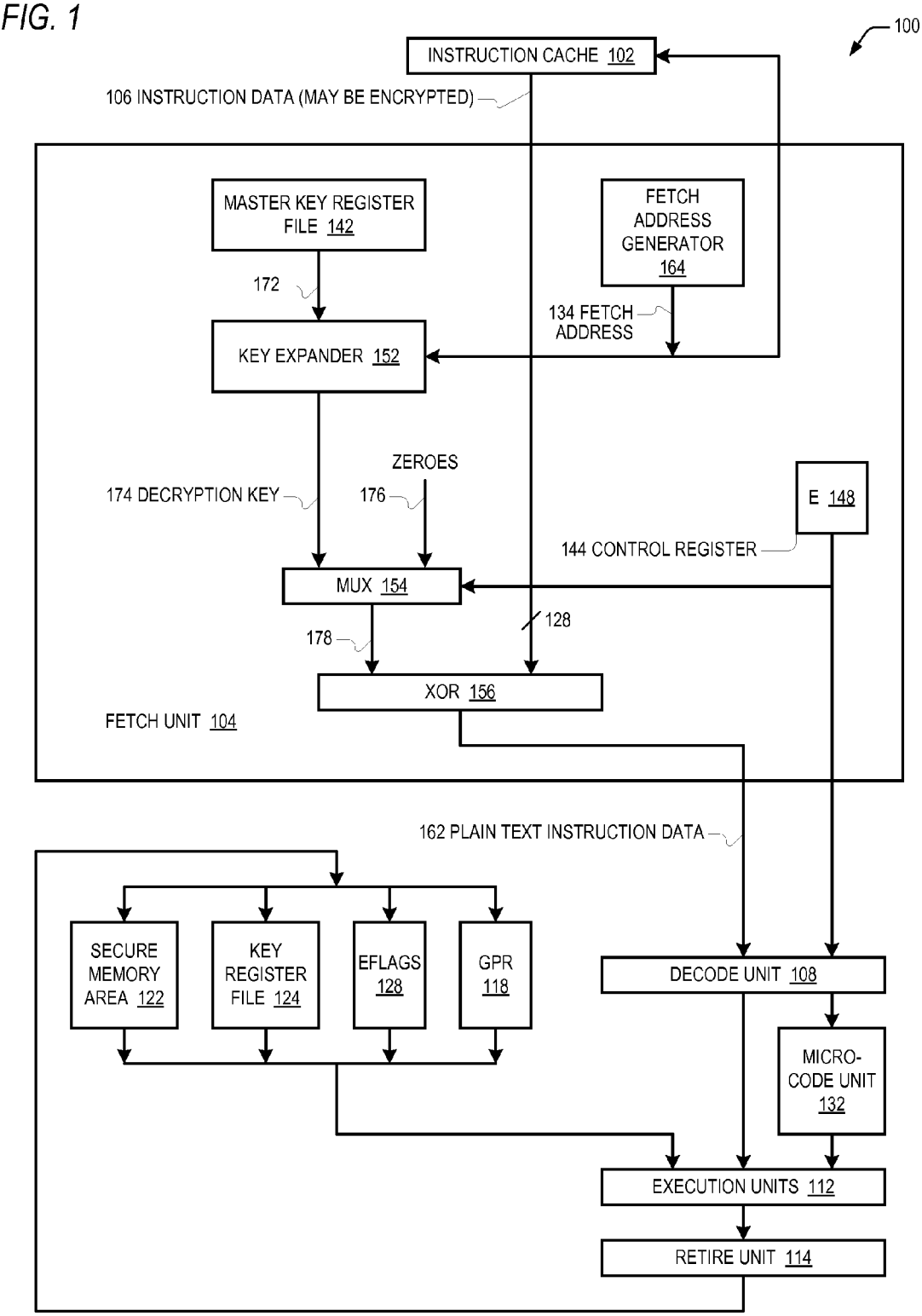
FIG. 1 is a block diagram illustrating a microprocessor according to the present invention.

Referring now to FIG. 1, a block diagram illustrating a microprocessor 100 according to the present invention is shown. The microprocessor 100 includes a pipeline including an instruction cache 102, a fetch unit 104, a decode unit 108, execution units 112, and a retire unit 114. The microprocessor 100 also includes a microcode unit 132 that provides microcode instructions to the execution units 112. The microprocessor 100 also includes general purpose registers 118 and an EFLAGS register 128 that provide instruction operands to the execution units 112 and are updated by the retire unit 114 with instruction execution results. In one embodiment, the EFLAGS register 128 is a conventional x86 EFLAGS register modified as described in more detail below.

The fetch unit 104 fetches instruction data 106 from the instruction cache 102. The fetch unit 104 operates in one of two modes: a decryption mode and a plain text mode. An E bit 148 in a control register 144 of the fetch unit 104 determines whether the fetch unit 104 is operating in decryption mode (E bit set) or plain text mode (E bit clear). In plain text mode, the fetch unit 104 treats the instruction data 106 fetched from the instruction cache 102 as non-encrypted, or plain text, instruction data and therefore does not decrypt the instruction data 106; however, in decryption mode, the fetch unit 104 treats the instruction data 106 fetched from the instruction cache 102 as encrypted instruction data that must be decrypted using decryption keys stored in a master key register file 142 of the fetch unit 104 into plain text instruction data, as described in more detail below with respect to FIGS. 2 and 3.

The fetch unit 104 also includes a fetch address generator 164 that generates a fetch address 134 that is used to fetch the instruction data 106 from the instruction cache 102. The fetch address 134 is also provided to a key expander 152 of the fetch unit 104. The key expander 152 selects two keys 172 from the master key register file 142 and performs an operation on them to generate a decryption key 174, which is provided as a first input to a mux 154. The second input to the mux 154 is binary zeroes 176. The E bit 148 controls the mux 154 such that if the E bit 148 is set, the mux 154 selects the decryption key 174 and selects the zeroes 176 if the E bit 148 is clear. The output 178 of the mux 154 is provided as a first input to XOR logic 156 which performs a Boolean exclusive-OR (XOR) operation of the fetched instruction data 106 with the mux output 178 to generate the plain text instruction data 162. The encrypted instruction data 106 was previously encrypted by XOR-ing its corresponding plain text instruction data with an encryption key having the same value as the decryption key 174. The fetch unit 104 will be described in more detail below with respect to FIGS. 2 and 3.

The plain text instruction data 162 is provided to the decode unit 108 which decodes the stream of plain text instruction data 162, breaks it down into distinct x86 instructions, and issues them to the execution units 112 for execution. In one embodiment, the decode unit 108 includes buffers, or queues, for buffering the stream of plain text instruction data 162 prior to and during decoding. In one embodiment, the decode unit 108 includes an instruction translator that translates the x86 instructions into microinstructions, or micro-ops, that are executed by the execution units 112. As the decode unit 108 emits instructions, it also emits a bit for each instruction that proceeds down the pipeline with the instruction to indicate whether or not the instruction was an encrypted instruction. The bit enables the execution units 112 and retire unit 114 to make decisions and take actions based on whether the instruction was an encrypted instruction or a plain text instruction when it was fetched from the instruction cache 102. In one embodiment, plain text instructions are not allowed to perform certain actions related to instruction decryption mode operation.

In one embodiment, the microprocessor 100 is an x86 architecture processor; however, other processor architectures may be employed. A processor is an x86 architecture processor if it can correctly execute a majority of the application programs that are designed to be executed on an x86 processor. An application program is correctly executed if its expected results are obtained. In particular, the microprocessor 100 executes instructions of the x86 instruction set and includes the x86 user-visible register set.

In one embodiment, the microprocessor 100 is configured to provide a comprehensive security architecture referred to as secure execution mode (SEM) in which programs may execute. According to one embodiment, execution of SEM programs can be invoked by several processor events and cannot be blocked by normal (non-SEM) execution. Examples of functions performed by programs executing in SEM include critical security tasks such as verifying certificates and encrypting data, monitoring system software activities, verifying the integrity of system software, tracking resource usage, controlling installation of new software, and so forth. Embodiments of the SEM are described in detail in U.S. patent application Ser. No. 12/263,131, filed Oct. 31, 2008 (CNTR.2322) (U.S. Publication No. 2009-0292893, Nov. 26, 2009), which claims priority to U.S. Provisional Application No. 61/055,980, filed, May 24, 2008, each of which is hereby incorporated by reference herein in its entirety. In one embodiment, a secure non-volatile memory (not shown) for SEM data, such as a flash memory, which may be used to store decryption keys, is coupled to the microprocessor 100 via a private serial bus, and all the data therein is AES-encrypted and signature-verified. In one embodiment, the microprocessor 100 includes a small amount of non-volatile write-once memory (not shown) that may be used to store decryption keys, which according to one embodiment is a fuse-embodied non-volatile storage described in U.S. Pat. No. 7,663,957, which is hereby incorporated by reference in its entirety. An advantage of the instruction decryption feature described herein is that it provides an extension to the SEM that enables secure programs to be stored in memory outside the microprocessor 100 rather than requiring the secure programs to be stored entirely within the microprocessor 100. Thus, the secure programs may be able to take advantage of the full size and function of the memory hierarchy. In one embodiment, some or all of the architectural exceptions/interrupts (e.g., page faults, debug breakpoints, etc.) are disabled when running in SEM mode. In one embodiment, some or all of the architectural exceptions/interrupts are disabled when running in decryption mode (i.e., when the E bit 148 is set).

The microprocessor 100 also includes a key register file 124. The key register file 124 comprises a plurality of registers from which keys may be loaded into the master key registers 142 of the fetch unit 104 via a switch key instruction (discussed below) for use in decrypting fetched encrypted instruction data 106.

The microprocessor 100 also includes a secure memory area (SMA) 122. The secure memory area 122 is used to store decryption keys waiting to be loaded into the key register file 124 by the load key instruction 500 of FIG. 5. In one embodiment, the secure memory area 122 is only accessible by SEM programs. That is, the secure memory area 122 is not accessible by programs executing in normal (i.e., non-SEM) execution mode. Furthermore, the secure memory area 122 is not accessible via the processor bus and is not part of the cache memory hierarchy of the microprocessor 100; hence, for example, a cache flush operation does not cause the contents of the secure memory area 122 to be written to memory. Special instructions exist within the instruction set architecture of the microprocessor 100 to read and write the secure memory area 122. According to one embodiment, the secure memory area 122 comprises a private RAM as described in more detail in U.S. patent application Ser. No. 12/034,503 (CNTR.2349), filed Feb. 20, 2008 (U.S. Publication No. 2008-0256336, Oct. 16, 2008), which is hereby incorporated by reference in its entirety.

Initially, the operating system or other privileged program loads an initial set of keys into the secure memory area 122, key register file 124, and master key register file 142. The microprocessor 100 will initially use the initial set of keys to decrypt an encrypted program. Additionally, the encrypted program itself may subsequently write new keys into the secure memory area 122, load the keys from the secure memory area 122 into the key register file 124 (via the load key instruction), and load the keys from the key register file 124 into the master key registers 142 (via the switch key instruction). Advantageously, the switch key instruction enables on-the-fly switching of the set of decryption keys while the encrypted program is running, as described below. The new keys may be composed of immediate data within the encrypted program instructions themselves. In one embodiment, a field in the header of the program file indicates whether or not the instructions of the program are encrypted.

Several advantages may be observed from FIG. 1. First, the plain text instruction data decrypted from the encrypted instruction data 106 is never observable outside the microprocessor 100.

Second, the fetch unit 104 embodiment requires the same time to fetch encrypted instruction data as it does to fetch plain text instruction data. This is critical to security. Otherwise, the time difference might create a vulnerability that an attacker might exploit to break the encryption.

Third, the instruction decryption feature adds no additional clock cycles to the fetch unit 104 over a conventional design. As discussed below, the key expander 152 increases the effective length of the decryption key used to decrypt an encrypted program, and it advantageously does so without causing the time required to fetch encrypted program data to be longer than the time required to fetch plain text program data. In particular, because the key expander 152 operates within the time required by the instruction cache 102 to lookup the fetch address 134 and provide the instruction data 106, the key expander 152 adds no time to the ordinary fetch process. Furthermore, because the mux 154 and key expander 152 together operate within the time required by the instruction cache 102 to lookup the fetch address 134 and provide the instruction data 106, they add no additional time to the ordinary fetch process. The XOR logic 156 is the only logic added to the ordinary fetch path, and advantageously, the propagation delay introduced by the XOR operation 156 is sufficiently small as to avoid requiring an increase in clock cycle time. Thus, the addition of the instruction decryption feature adds no additional clock cycles to the fetch unit 104. Furthermore, this is in contrast to a conceivable implementation that incorporates a complex decryption mechanism, such as S-boxes, to decrypt the instruction data 106, which would require an increase in cycle time and/or an increase in the number of clock cycles required to fetch and decode the instruction data 106.

Figure 2:
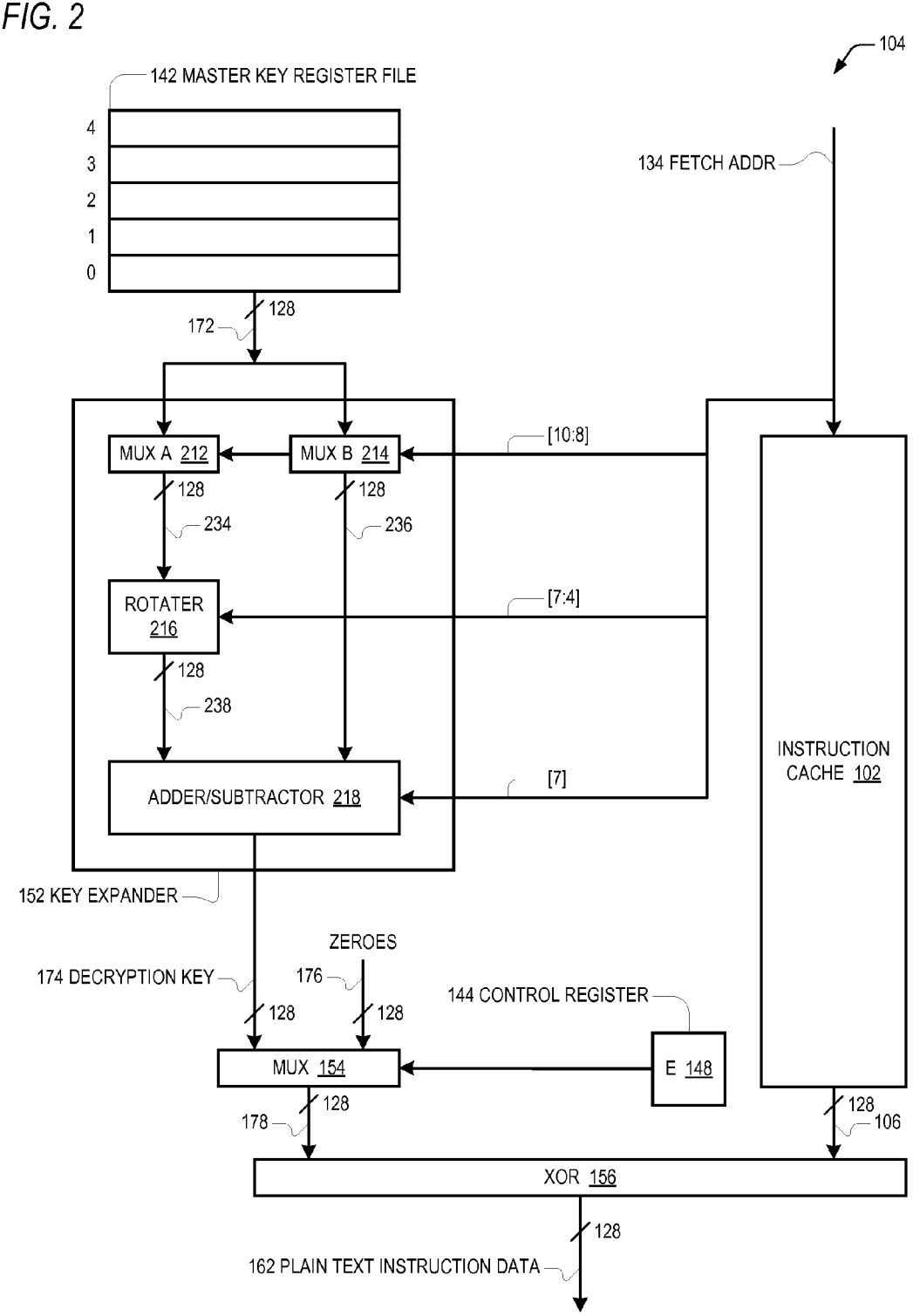
FIG. 2 is a block diagram illustrating in more detail the fetch unit of FIG. 1.

Referring now to FIG. 2, a block diagram illustrating in more detail the fetch unit 104 of FIG. 1 is shown. In particular, the details of the key expander 152 of FIG. 1 are shown. The advantages of using an XOR function to decrypt the encrypted instruction data 106 are discussed above. However, the fast and small XOR function has the disadvantage that it is inherently a weak encryption method if the encryption/decryption key is re-used. However, if the effective length of the key is equal to the length of the program being encrypted/decrypted, the XOR encryption is a very strong form of encryption. Advantageously, the microprocessor 100 includes features to increase the effective length of the decryption key in order to reduce the need to re-use the key. First, the values stored in the master key register file 142 are of moderately large size: in one embodiment, they are the size of a fetch quantum, or block, of the instruction data 106 from the instruction cache 102, which is 128 bits (16 bytes). Second, the key expander 152 operates to increase the effective length of the decryption key, such as to 2,048 bytes according to one embodiment, as described in more detail below. Third, the encrypted program may change the values in the master key registers 142 on-the-fly while it is executing using a switch key instruction (and variants thereof) described below.

In the embodiment of FIG. 2, there are five master key registers 142, indexed as 0 through 4. However, other embodiments are contemplated in which a smaller or larger number of master key registers 142 are employed to increase the effective decryption key length. For example, an embodiment is contemplated in which there are twelve master key registers 142. The key expander 152 includes a first mux A 212 and a second mux B 214 that receive the keys from master key registers 142. A portion of the fetch address 134 controls the muxes 212/214. In the embodiment of FIG. 2, mux B 214 is a 3:1 mux and mux A 212 is a 4:1 mux. Table 1 describes the master key registers 142 index selected by the muxes 212/214 based on their select input values, and Table 2 shows the generation of the select input values and consequent master key registers 142 combinations as a function of fetch address 134 bits [10:8].

TABLE 1

| MuxB select | index of selected master key register | MuxA select | index of selected master key register |
|---|---|---|---|
| 00 | 0 | 00 | 1 |
| 01 | 1 | 01 | 2 |
| 10 | 2 | 10 | 3 |
|   |   | 11 | 4 |

TABLE 2

| Fetch Address [10:8] | MuxB-MuxA Combination | MuxB select | MuxA select |
|---|---|---|---|
| 000 | 0-1 | 00 | 00 |
| 001 | 0-2 | 00 | 01 |
| 010 | 0-3 | 00 | 10 |
| 011 | 0-4 | 00 | 11 |
| 100 | 1-2 | 01 | 01 |
| 101 | 1-3 | 01 | 10 |
| 110 | 1-4 | 01 | 11 |
| 111 | 2-3 | 10 | 10 |

The output 236 of mux B 214 is provided to an adder/subtractor 218. The output 234 of mux A 212 is provided to a rotater 216. The rotater 216 receives bits [7:4] of the fetch address 134, whose value controls the number of bytes the rotater 216 rotates the mux output 234. In one embodiment, the bits [7:4] of the fetch address 134 are incremented prior to being used by the rotater 216 to control the number of bytes to rotate, as shown in Table 3 below. The output 238 of the rotater 216 is provided to the adder/subtractor 218. The adder/subtractor 218 receives bit [7] of the fetch address 134. If bit [7] is clear, the adder/subtractor 218 subtracts the output 238 of the rotater 216 from the output 236 of mux B 214; otherwise, if bit [7] is set, the adder/subtractor 218 adds the output 238 of the rotater 216 to the output 236 of mux B 214. The output of the adder/subtractor 218 is the decryption key 174 of FIG. 1 that is provided to mux 154. This operation is described in the flowchart of FIG. 3.

Figure 3:
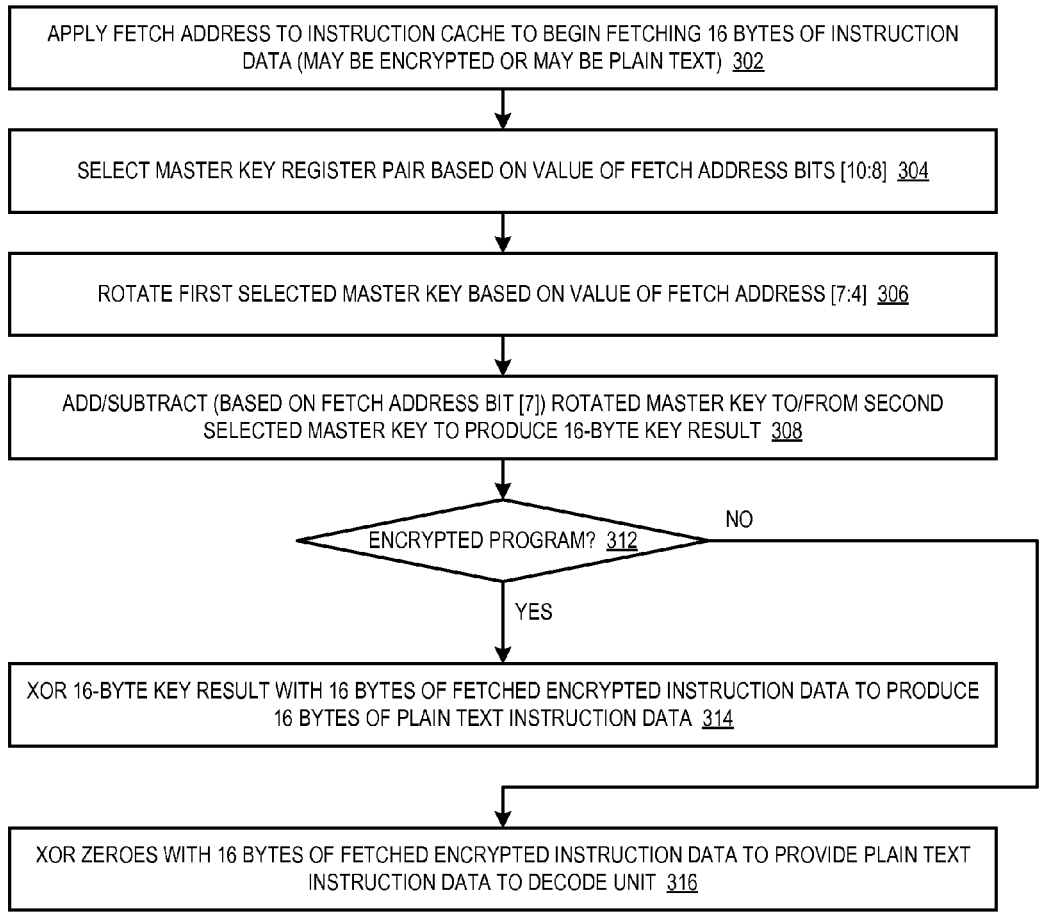
FIG. 3 is a flowchart illustrating operation of the fetch unit of FIG. 2 according to the present invention.

Referring now to FIG. 3, a flowchart illustrating operation of the fetch unit 104 of FIG. 2 according to the present invention is shown. Flow begins at block 302.

At block 302, the fetch unit 104 applies the fetch address 134 to the instruction cache 102 to begin fetching a 16-byte block of instruction data 106. The instruction data 106 may be encrypted or it may be plain text, depending upon whether the instruction data 106 is part of an encrypted or plain text program, which is indicated by the E bit 148. Flow proceeds to block 304.

At block 304, mux A 212 selects a first key 234 and mux B 214 selects a second key 236 from among the keys 172 of the master key register file 142 based on upper fetch address 134 bits. In one embodiment, the fetch address 134 bits are employed by the muxes 212/214 to select only unique combinations of the key 234/236 pairs. In the embodiment of FIG. 2 in which five master key registers 142 are provided, there exists ten possible unique combinations of the master key registers 142, and to simply the hardware design, eight of the combinations are employed. As discussed in more detail below, this advantageously yields an effective key of 2,048 bytes. However, other embodiments are contemplated with a different number of master key registers 142. For example, an embodiment is contemplated in which twelve master key registers 142 are provided, for which there exists 66 possible unique combinations of the master key registers 142, such that if 64 of the combinations are employed, this yields an effective key of 16,384 bytes. Flow proceeds to block 306.

At block 306, the rotater 216 rotates the first key 234 a number of bytes based on the value of fetch address 134 bits [7:4] to generate a rotated first key 238. For example, if the value of fetch address 134 bits [7:4] is nine, then the rotater 216 rotates the first key 234 right nine bytes. Flow proceeds to block 308.

At block 308, the adder/subtractor 218 adds/subtracts the rotated first key 238 to/from the second key 236 to produce the decryption key 174 of FIG. 1. In one embodiment, if bit [7] of the fetch address 134 is one, then the adder/subtractor 218 adds the rotated first key 238 to the second key 236; whereas, if bit [7] of the fetch address 134 is zero, then the adder/subtractor 218 subtracts the rotated first key 238 from the second key 236. Flow proceeds to decision block 312.

At decision block 312, the mux 154 determines whether the fetched block of instruction data 106 is from an encrypted or plain text program based on its control input, which is the E bit 148 from the control register 144. If the instruction data 106 is encrypted, flow proceeds to block 314; otherwise, flow proceeds to block 316.

At block 314, the mux 154 selects the decryption key 174 and the XOR gate 156 performs a Boolean XOR operation on the encrypted instruction data 106 with the decryption key 174 to generate the plain text instruction data 162 of FIG. 1. Flow ends at block 314.

At block 316, the mux 154 selects the sixteen bytes of zeroes 176 and the XOR gate 156 performs a Boolean XOR operation on the instruction data 106 (which is plain text) with the zeroes to generate the same plain text instruction data 162. Flow ends at block 316.

As may be observed from FIGS. 2 and 3, the derived decryption key 174 that is XORed with a given block of instruction data 106 is a function only of the selected master key pair 234/236 and the fetch address 134. This is in contrast to a classical decryption mechanism that is a function of a previous key value by continually modifying the key and feeding the new key back into the next cycle. The fact that the derived decryption key 174 is a function of only the master key pair and the fetch address 134 is advantageous for at least two reasons. First, as mentioned above, it enables both encrypted and plain text instruction data 106 to be fetched in the same amount of time and does not increase the cycle time of the microprocessor 100. Second, it does not increase the time required to fetch instruction data 106 in the presence of a branch instruction in the program. In one embodiment, a branch predictor receives the fetch address 134 and predicts the presence, direction, and target address of a branch instruction within the block of instruction data 106 at the fetch address 134. In the embodiment of FIG. 2, the fact that the derived decryption key 174 is a function only of the master key pair 234/236 and the fetch address 134 enables it to generate the appropriate decryption key 174 for the predicted target address during the same clock that the block of instruction data 106 at the target address arrives at the XOR gate 156. This avoids the requirement that would be generated by a classical decryption key calculation mechanism to perform multiple "rewind" steps to calculate the decryption key for the target address, thereby incurring additional delay in the case of encrypted instruction data.

As may also be observed from FIGS. 2 and 3, the rotater 216 and adder/subtractor 218 of the key expander 152 work together to effectively expand the decryption key length beyond the length of the master keys 142. In other words, the master keys 142 are collectively 32 bytes (2*16 bytes); however, from the perspective of an attacker attempting to determine the decryption keys 174, the rotater 216 and adder/subtractor 218 effectively expand the 32 bytes of master keys 142 into a 256-byte expanded key sequence. More specifically, byte n of the effectively expanded key sequence is:

$$k_{0_n} \pm {}^k 1_{n+x}$$

where $^k 0_n$ is byte n of the first master key 234 and $^k 1_{n+x}$ is byte n+x of the second master key 236. As described above, the first eight sets of 16-byte decryption keys 174 generated by the key expander 152 are formed by a subtraction, and the second eight sets are formed by an addition. Specifically, the pattern of bytes of each selected master key pair 234/236 used to generate the decryption key 174 bytes for each corresponding byte of sixteen sequential 16-byte blocks of instruction data is shown below in Table 3. For example, the notation "15-00" in the first line of Table 3 indicates that byte 0 of the second master key 236 is subtracted via an eight-bit arithmetic operation from byte 15 of the first master key 234 to generate the effective decryption key 174 byte to be XORed with byte 15 of a 16-byte block of instruction data 106.

TABLE 3

| | | | | | | | | | | | | | | | |
|---|---|---|---|---|---|---|---|---|---|---|---|---|---|---|---|
| 15-00 | 14-15 | 13-14 | 12-13 | 11-12 | 10-11 | 09-10 | 08-09 | 07-08 | 06-07 | 05-06 | 04-05 | 03-04 | 02-03 | 01-02 | 00-01 |
| 15-01 | 14-00 | 13-15 | 12-14 | 11-13 | 10-12 | 09-11 | 08-10 | 07-09 | 06-08 | 05-07 | 04-06 | 03-05 | 02-04 | 01-03 | 00-02 |
| 15-02 | 14-01 | 13-00 | 12-15 | 11-14 | 10-13 | 09-12 | 08-11 | 07-10 | 06-09 | 05-08 | 04-07 | 03-06 | 02-05 | 01-04 | 00-03 |
| 15-03 | 14-02 | 13-01 | 12-00 | 11-15 | 10-14 | 09-13 | 08-12 | 07-11 | 06-10 | 05-09 | 04-08 | 03-07 | 02-06 | 01-05 | 00-04 |
| 15-04 | 14-03 | 13-02 | 12-01 | 11-00 | 10-15 | 09-14 | 08-13 | 07-12 | 06-11 | 05-10 | 04-09 | 03-08 | 02-07 | 01-06 | 00-05 |
| 15-05 | 14-04 | 13-03 | 12-02 | 11-01 | 10-00 | 09-15 | 08-14 | 07-13 | 06-12 | 05-11 | 04-10 | 03-09 | 02-08 | 01-07 | 00-06 |
| 15-06 | 14-05 | 13-04 | 12-03 | 11-02 | 10-01 | 09-00 | 08-15 | 07-14 | 06-13 | 05-12 | 04-11 | 03-10 | 02-09 | 01-08 | 00-07 |
| 15-07 | 14-06 | 13-05 | 12-04 | 11-03 | 10-02 | 09-01 | 08-00 | 07-15 | 06-14 | 05-13 | 04-12 | 03-11 | 02-10 | 01-09 | 00-08 |
| 15+08 | 14+07 | 13+06 | 12+05 | 11+04 | 10+03 | 09+02 | 08+01 | 07+00 | 06+15 | 05+14 | 04+13 | 03+12 | 02+11 | 01+10 | 00+09 |
| 15+09 | 14+08 | 13+07 | 12+06 | 11+05 | 10+04 | 09+03 | 08+02 | 07+01 | 06+00 | 05+15 | 04+14 | 03+13 | 02+12 | 01+11 | 00+10 |

TABLE 3-continued

| | | | | | | | | | | | | | | | |
|---|---|---|---|---|---|---|---|---|---|---|---|---|---|---|---|
| 15+10 | 14+09 | 13+08 | 12+07 | 11+06 | 10+05 | 09+04 | 08+03 | 07+02 | 06+01 | 05+00 | 04+15 | 03+14 | 02+13 | 01+12 | 00+11 |
| 15+11 | 14+10 | 13+09 | 12+08 | 11+07 | 10+06 | 09+05 | 08+04 | 07+03 | 06+02 | 05+01 | 04+00 | 03+15 | 02+14 | 01+13 | 00+12 |
| 15+12 | 14+11 | 13+10 | 12+09 | 11+08 | 10+07 | 09+06 | 08+05 | 07+04 | 06+03 | 05+02 | 04+01 | 03+00 | 02+15 | 01+14 | 00+13 |
| 15+13 | 14+12 | 13+11 | 12+10 | 11+09 | 10+08 | 09+07 | 08+06 | 07+05 | 06+04 | 05+03 | 04+02 | 03+01 | 02+00 | 01+15 | 00+14 |
| 15+14 | 14+13 | 13+12 | 12+11 | 11+10 | 10+09 | 09+08 | 08+07 | 07+06 | 06+05 | 05+04 | 04+03 | 03+02 | 02+01 | 01+00 | 00+15 |
| 15+15 | 14+14 | 13+13 | 12+12 | 11+11 | 10+10 | 09+09 | 08+08 | 07+07 | 06+06 | 05+05 | 04+04 | 03+03 | 02+02 | 01+01 | 00+00 |

Given appropriate master key 142 values, the expanded keys generated by the key expander 152 may exhibit good statistical properties that significantly hinder the common attack on XOR-based encryption, which involves shifting an encrypted block of text by the key length and XORing the encrypted blocks together, as discussed below in more detail. The net effect of the key expander 152 on a given selected master key pair 234/236 is that the span between two instruction data 106 bytes of the program that are encrypted with the same exact key can be up to 256 bytes in the embodiment shown. Other embodiments are contemplated having different instruction data 106 block sizes and master key 142 lengths that yield different values for the maximum span between two instruction data 106 bytes encrypted with the same key.

The plurality of master key registers 142 and muxes 212/214 of the key expander 152 functioning to select the master key pair 234/236 also operate to extend the effective key length. As discussed above, in the embodiment of FIG. 2 in which five master key registers 142 are provided, there exists ten possible unique combinations of the master key registers 142, and the muxes 212/214 operate to select eight of the ten possible combinations. The 256-byte effective key length per key pair 234/236 of Table 3 in conjunction with the eight unique combinations of key pairs 234/236 yields an effective key length of 2,048 bytes. That is, the span between two instruction data 106 bytes of the program that are encrypted with the same exact key can be up to 2,048 bytes in the embodiment shown.

To further appreciate the advantages afforded by the key expander 152, a brief explanation of a common method of attack on XOR-based encryption schemes is given. If the key length employed by an XOR encryption algorithm is shorter than the length of the program instruction data to be encrypted/decrypted, the key must be reused for potentially many bytes, depending upon the length of the program. This vulnerability leads to a classic way to break an XOR instruction encryption scheme. First, the attacker attempts to determine the length of the repeating key, which is n+1 in the conventional example of lines (1) through (3) below. Second, the attacker assumes each key-length block of instruction data is encrypted with the same key. To illustrate, consider two key-length blocks of data encrypted according to a conventional XOR encryption algorithm:

$$^b n_0 \hat{} ^k n, \ldots, ^b 1_0 \hat{} ^k 1, ^b 0_0 \hat{} ^k 0 \quad (1)$$

$$^b n_1 \hat{} ^k n, \ldots, ^b 1_1 \hat{} ^k 1, ^b 0_1 \hat{} ^k 0, \quad (2)$$

where $^b n_0$ is byte n of the first key-length block of data being encrypted, $^b n_1$ is byte n of the second key-length block of data being encrypted, and $^k n$ is byte n of the key. Third, the attacker XORs the two blocks together, in which case the key portions cancel each other leaving:

$$^b n_0 \hat{} ^b n_1, \ldots, ^b 1_0 \hat{} ^b 1_1, ^b 0_0 \hat{} ^b 0_1. \quad (3)$$

Finally, since the resultant bytes are a function of only two plain-text bytes, the attacker employs statistical analysis of plain-text frequencies to try to derive the plain-text byte values.

In contrast, the pattern of encrypted instruction data 106 bytes according to the embodiment of FIGS. 2 and 3 are described below in lines (4) and (5):

$$^b n_0 \hat{} (^k n_x \hat{} ^\pm ^k 0_y), \ldots, ^b 1_0 \hat{} (^k 1_x \hat{} ^\pm ^k 2_y), ^b 0_0 \hat{} (^k 0_x \hat{} ^\pm ^k 1_y) \quad (4)$$

$$^b n_1 \hat{} (^k n_x \hat{} ^\pm ^k 1_y), \ldots, ^b 1_1 \hat{} (^k 1_x \hat{} ^\pm ^k 3_y), ^b 0_1 \hat{} (^k 0_x \hat{} ^\pm ^k 2_y), \quad (5)$$

where $^b n_0$ denotes byte n of a first 16-byte block of instruction data being encrypted, $^b n_1$ denotes byte n of a next 16-byte block of instruction data being encrypted, $^k n_x$ denotes byte n of a master key x, and $^k n_y$ denotes byte n of a master key y. As discussed above, the master keys x and y are different keys. Assuming the eight different combinations of the master key pair 234/236 afforded by an embodiment with five master key registers 142, each byte within a 2,048-byte sequence is XORed with a different combination of two independent master key 142 bytes. Thus, when encrypted data is shifted in any fashion within the 256-byte block and XORed together there remains a complex component of the two master keys left in the result byte such that, unlike the result in line (3), the result is a function of more than just plain text bytes. For example, if the attacker chooses to align and XOR 16-byte blocks within the same 256-byte block such that the same key 0 bytes are used in each term, the result for byte 0 is shown here in line (6) having a complex component of the two master keys left in the result byte:

$$^b 0_0 \hat{} (^k 0_x \hat{} ^\pm ^k 1_y) \hat{} ^b 0_1 \hat{} (^k 0_x \hat{} ^\pm ^k n_y), \quad (6)$$

where n is different than 1.

Still further, if the attacker chooses to align and XOR 16-byte blocks from different 256-byte blocks, the result for byte 0 is shown here in line (7):

$$^b 0_0 \hat{} (^k 0_x \hat{} ^\pm ^k 1_y) \hat{} ^b 0_1 \hat{} (^k 0_u \hat{} ^\pm ^k n_v), \quad (7)$$

where at least one of the master keys u and v is different than both master keys x and y. Simulation of XORing the effective key bytes generated from random master key values has displayed a relatively smooth distribution of the resulting $(^k 0_x \hat{} ^\pm ^k 1_y) \hat{} (^k 0_u \hat{} ^\pm ^k n_v)$ values.

Of course, if the attacker chooses to align and XOR 16-byte blocks from different 2,048-byte blocks, the attacker may achieve a similar result as shown in line (3). However, the following is noted. First, some programs, such as security-related programs, may be shorter than 2,048 bytes. Second, the statistical correlation between instruction bytes that are 2,048 bytes apart is likely very small, thus increasing the difficulty of successfully breaking the scheme. Third, as mentioned above, embodiments are contemplated in which the number of the master key registers 142 may be increased to further extend the effective length of the decryption key, such as to 16,384 by providing twelve master key registers 142, for example, or longer. Fourth, the load key instruction 500 and switch key instruction 600 discussed below provide a means for the programmer to load new values into the master key register file 142 to effectively extend the length of the key greater than 2,048 and, if necessary, to extend the key length to the entire length of program.

Figure 4:
FIG. 4 is a block diagram illustrating the fields of the EFLAGS register of FIG. 1 according to the present invention.

Referring now to FIG. 4, a block diagram illustrating the fields of the EFLAGS register 128 of FIG. 1 according to the present invention is shown. According to the embodiment of FIG. 4, the EFLAGS register 128 includes the standard x86 EFLAGS register bits 408; however, the embodiment of FIG. 4 uses for new purposes described herein a bit that is conventionally RESERVED by the x86 architecture. In particular, the EFLAGS register 128 includes an E bit field 402. The E bit 402 is used to restore the control register 144 E bit 148 value in order to facilitate switching between encrypted and plain text programs and/or between different encrypted programs, as described in more detail below. The E bit 402 indicates whether the currently executing program is encrypted. The E bit 402 is set if the currently executing program is encrypted; otherwise, it is clear. Advantageously, the EFLAGS register 128 gets saved when an interrupting event occurs that switches control to another program, such as an interrupt, exception (such as a page fault), or task switch. Conversely, the EFLAGS register 128 gets restored when control returns to the program that was interrupted by the interrupting event. The microprocessor 100 is configured such that, advantageously, when the EFLAGS register 128 is restored, the microprocessor 100 also updates the value of the control register 144 E bit 148 with the value of the EFLAGS register 128 E bit 402, as described in more detail below. Therefore, if an encrypted program was executing when the interrupting event occurred, i.e., the fetch unit 104 was in decryption mode, when control is returned to the encrypted program, the fetch unit 104 is restored to decryption mode by the setting of the E bit 148 via the restored E bit 402. In one embodiment, the E bit 148 and the E bit 402 are the same physical hardware bit such that saving the value of the EFLAGS register 128 E bit 402 saves the E bit 148 and restoring a value the EFLAGS register 128 E bit 402 restores the E bit 148.

Figure 5:
FIG. 5 is a block diagram illustrating the format of a load key instruction according to the present invention.

Referring now to FIG. 5, a block diagram illustrating the format of a load key instruction 500 according to the present invention is shown. The load key instruction 500 includes an opcode 502 field that uniquely identifies the load key instruction 500 within the instruction set of the microprocessor 100. In one embodiment, the opcode field 502 value is 0FA6/4 (in x86 notation). The load key instruction 500 includes two operands: a key register file destination address 504 and an SMA source address 506. The SMA address 506 is an address of a location within the secure memory area 122 in which a 16-byte master key is stored. The key register file address 504 specifies a register within the key register file 124 into which the 16-byte master key from the secure memory area 122 is to be loaded. In one embodiment, if a program attempts to execute a load key instruction 500 when the microprocessor 100 is not in secure execution mode, an invalid instruction exception is taken, and if the SMA address 506 value is outside the valid secure memory area 122, a general protection exception is taken. In one embodiment, if a program attempts to execute a load key instruction 500 when the microprocessor 100 is not in the highest privilege level (e.g., x86 ring 0), an invalid instruction exception is taken. In some instances, the constituent parts of the 16-byte master keys may be included in an immediate data field of the encrypted instructions. The immediate data may be moved piece by piece into the secure memory area 122 to construct the 16-byte keys.

Figure 6:
FIG. 6 is a block diagram illustrating the format of a switch key instruction according to the present invention.

Referring now to FIG. 6, a block diagram illustrating the format of a switch key instruction 600 according to the present invention is shown. The switch key instruction 600 includes an opcode 602 field that uniquely identifies the switch key instruction 600 within the instruction set of the microprocessor 100. The switch key instruction 600 also includes a key register file index field 604 that specifies the first of a sequence of registers within the key register file 124 from which the keys will be loaded into the master key registers 142. In one embodiment, if a program attempts to execute a switch key instruction 600 when the microprocessor 100 is not in secure execution mode, an invalid instruction exception is taken. In one embodiment, if a program attempts to execute a switch key instruction 600 when the microprocessor 100 is not in the highest privilege level (e.g., x86 ring 0), an invalid instruction exception is taken. In one embodiment, the switch key instruction 600 is atomic, i.e., non-interruptible, as are the other instructions described herein that loads the master key registers 142, such as the branch and switch key instructions described below.

Figure 7:
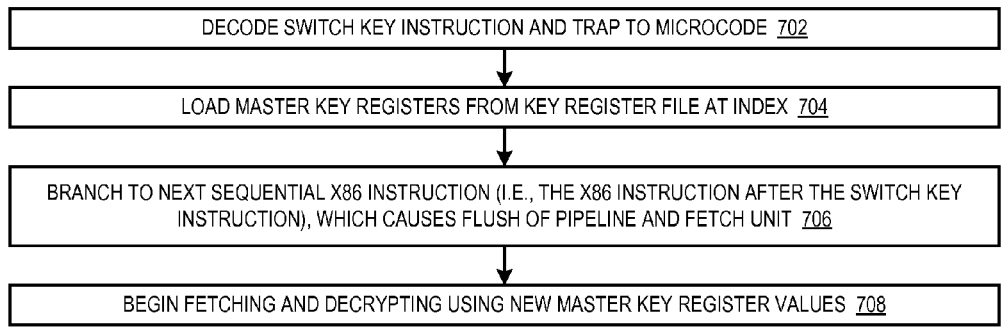
FIG. 7 is a flowchart illustrating operation of the microprocessor of FIG. 1 to perform the switch key instruction of FIG. 6 according to the present invention.

Referring now to FIG. 7, a flowchart illustrating operation of the microprocessor 100 of FIG. 1 to perform the switch key instruction 600 of FIG. 6 according to the present invention is shown. Flow begins at block 702.

At block 702, the decode unit 108 decodes a switch key instruction 600 and traps to the microcode routine in the microcode unit 132 that implements the switch key instruction 600. Flow proceeds to block 704.

At block 704, the microcode loads the master key registers 142 from the key register file 124 based on the key register file index field 604. Preferably, the microcode loads n keys from n adjacent registers of the key register file 124 beginning at the key register specified in the key register file index field 604 into the master key registers 142, where n is the number of master key registers 142. In one embodiment, n may be specified within an additional field of the switch key instruction 600 to be less than the number of master key registers 142. Flow proceeds to block 706.

At block 706, the microcode causes the microprocessor 100 to branch to the next sequential x86 instruction, i.e., to the instruction after the switch key instruction 600, which causes all x86 instructions in the microprocessor 100 to be flushed that are newer than the switch key instruction 600 and which causes all micro-ops in the microprocessor 100 to be flushed that are newer than the micro-op that branches to the next sequential x86 instruction. This includes all instruction bytes 106 fetched from the instruction cache 102 that may be waiting in buffers of the fetch unit 104 to be decrypted and the decode unit 108 to be decoded. Flow proceeds to block 708.

At block 708, as a result of the branch to the next sequential instruction at block 706, the fetch unit 104 begins fetching and decrypting instruction data 106 from the instruction cache 102 using the new set of key values loaded into the master key registers 142 at block 704. Flow ends at block 708.

As may be observed from FIG. 7, the switch key instruction 600 advantageously enables a currently executing encrypted program to change the values in the master key registers 142 being used to decrypt the encrypted program when fetched from the instruction cache 102. This on-the-fly changing of the master key register 142 values may be employed to increase the effective key length used to encrypt the program beyond the length inherently provided by the fetch unit 104 (2,048 bytes according to the embodiment of FIG. 2, for example), as illustrated in FIG. 8, thereby greatly increasing the difficulty of an attacker to breach the security of the computer system that incorporates the microprocessor 100 if FIG. 1.

Figure 8:
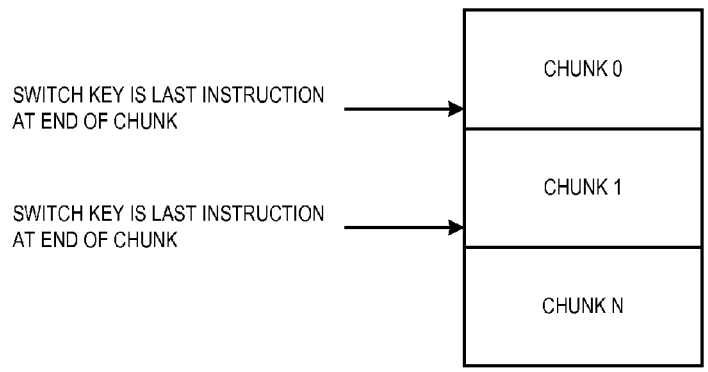
FIG. 8 is a block diagram illustrating a memory footprint of an encrypted program that includes switch key instructions of FIG. 6 according to the present invention.

Referring now to FIG. 8, a block diagram illustrating a memory footprint 800 of an encrypted program that includes switch key instructions 600 of FIG. 6 according to the present invention is shown. The encrypted program memory footprint 800 of FIG. 8 comprises sequential chunks of bytes of instruction data. A chunk is a sequence of instruction data bytes that are to be decrypted (because they have been previously encrypted) with the same set of master key register 142 values. Thus, each switch key instruction 600 defines the boundary between two chunks. That is, the upper and lower boundaries of the chunks are defined by the location of a switch key instruction 600 (or, in the case of the first chunk of the program, the upper boundary is the beginning of the program; and, in the case of the last chunk of the program, the lower boundary is the end of the program). Thus, each chunk of instruction data bytes will be decrypted by the fetch unit 104 with a different set of master key register 142 values, namely the values loaded into the master key register file 142 via the switch key instruction 600 of the preceding chunk. A post-processor that encrypts the program knows the memory address of the location of each switch key instruction 600 and uses that information, namely the relevant address bits of the fetch address, along with the switch key instruction 600 key values to generate the encryption key bytes to encrypt the program. Some object file formats allow the programmer to specify the memory location at which the program is to be loaded, or at least alignment to a particular size, such as a page boundary, which provides sufficient address information to encrypt the program. Additionally, some operating systems load programs on a page boundary by default.

The switch key instructions 600 may be located anywhere within the program. However, if each switch key instruction 600 loads unique values into the master key registers 142 to be used to decrypt the next sequential chunk of instruction data bytes, and if the switch key instructions 600 (and load key instructions 400, if necessary) are placed such that the length of each chunk is less than or equal to the effective key length afforded by the fetch unit 104 (e.g., 2,048 bytes in the embodiment of FIG. 2), then the program can be encrypted with a key whose effective length is as long as the entire program, thereby providing very strong encryption. Furthermore, even if the switch key instructions 600 are employed such that the effective key length is shorter than the length of the encrypted program, i.e., even if the same set of master key register 142 values are used to encrypt multiple chunks of the program, varying the size of the chunks (e.g., not making them all 2,048 bytes) may make the attacker's task more difficult because the attacker must first determine where chunks encrypted with the same set of master key register 142 values reside and the lengths of each of these variable-length chunks.

It is noted that the on-the-fly key switch performed by the switch key instruction 600 requires a relatively large number of clock cycles to execute primarily due to the pipeline flush. Additionally, according to one embodiment, the switch key instruction 600 is implemented primarily in microcode, which is generally slower than non-microcode-implemented instructions. Consequently, the impact of switch key instructions 600 on performance should be taken into account by the code developer, which may require a balancing of execution speed and security for a given application.

Referring now to FIG. 9, a block diagram illustrating the format of a branch and switch key instruction 900 according to the present invention is shown. First, a description of the need for the branch and switch key instruction 900 will be provided.

According to the embodiments described above, each 16-byte block of instruction data of the encrypted program to be fetched by the fetch unit 104 must be encrypted (XORed) with the same 16-bytes of decryption key 174 values that will be used by the fetch unit 104 to decrypt (XOR) the fetched block of instruction data 106. As described above, the decryption key 174 byte values are computed by the fetch unit 104 based on two inputs: the master key byte values stored in the master key registers 142 and certain bits of the fetch address 134 of the 16-byte block of instruction data 106 being fetched (bits [10:4] in the example embodiment of FIG. 2). Therefore, a post-processor that encrypts the programs to be executed by the microprocessor 100 knows both the master key byte values that will be stored in the master key registers 142 and the address, or more specifically the relevant address bits, at which the encrypted program will be loaded into memory and from which the microprocessor 100 will subsequently fetch the blocks of instruction data of the encrypted program. From this information, the post-processor generates the appropriate decryption key 174 value to use to encrypt each 16-byte instruction data block of the program.

As discussed above, when a branch instruction is predicted and/or executed, the fetch unit 104 uses the branch target address to update the fetch address 134. As long as an encrypted program never changes the master key values in the master key registers 142 (via the switch key instruction 600), the presence of branch instructions is handled transparently by the fetch unit 104. That is, the fetch unit 104 uses the same master key register 142 values to calculate the decryption key 174 to decrypt the block of instruction data 106 that includes the branch instruction as the block of instruction data 106 that includes the instructions at the target address. However, the ability of the program to change the master key register 142 values (via the switch key instruction 600) implies the possibility that the fetch unit 104 will use one set of master key register 142 values to calculate the decryption key 174 to decrypt the block of instruction data 106 that includes the branch instruction and a different set of master key register 142 values to calculate the decryption key 174 to decrypt the block of instruction data 106 that includes the instructions at the target address. One way to avoid this problem is to restrict branch target addresses to be within the same program chunk. Another solution is provided by the branch and switch key instruction 900 of FIG. 9.

Referring again to FIG. 9, a block diagram illustrating the format of a branch and switch key instruction 900 according to the present invention is shown. The branch and switch key instruction 900 includes an opcode 902 field that uniquely identifies the branch and switch key instruction 900 within the instruction set of the microprocessor 100. The branch and switch key instruction 900 also includes a key register file index field 904 that specifies the first of a sequence of registers within the key register file 124 from which the keys will be loaded into the master key registers 142. The branch and switch key instruction 900 also includes a branch information field 906 that includes information typical of branch instructions, such as information for computing a target address and a branch condition. In one embodiment, if a program attempts to execute a branch and switch key instruction 900 when the microprocessor 100 is not in secure execution mode, an invalid instruction exception is taken. In one embodiment, if a program attempts to execute a switch key instruction 900 when the microprocessor 100 is not in the highest privilege level (e.g., x86 ring 0), an invalid instruction exception is taken. In one embodiment, the branch and switch key instruction 900 is atomic.

Referring now to FIG. 10, a flowchart illustrating operation of the microprocessor 100 of FIG. 1 to perform the branch and switch key instruction 900 of FIG. 9 according to the present invention is shown. Flow begins at block 1002.

At block 1002, the decode unit 108 decodes a branch and switch key instruction 900 and traps to the microcode routine in the microcode unit 132 that implements the branch and switch key instruction 900. Flow proceeds to block 1004.

At block 1006, the microcode resolves the branch direction (i.e., taken or not taken) and target address. It is noted that in the case of unconditional type branch instructions, the direction is always taken. Flow proceeds to decision block 1008.

At decision block 1008, the microcode determines whether the direction resolved at block 1006 is taken. If so, flow proceeds to block 1014; otherwise, flow proceeds to block 1012.

At block 1012, the microcode does not switch keys or branch to the target address, since the branch was not taken. Flow ends at block 1012.

At block 1014, the microcode loads the master key registers 142 from the key register file 124 based on the key register file index field 904. Preferably, the microcode loads n keys from n adjacent registers of the key register file 124 beginning at the key register specified in the key register file index field 904 into the master key registers 142, where n is the number of master key registers 142. In one embodiment, n may be specified within an additional field of the branch and switch key instruction 900 to be less than the number of master key registers 142. Flow proceeds to block 1016.

At block 1016, the microcode causes the microprocessor 100 to branch to the target address resolved at block 1006, which causes all x86 instructions in the microprocessor 100 to be flushed that are newer than the branch and switch key instruction 900 and which causes all micro-ops in the microprocessor 100 to be flushed that are newer than the micro-op that branches to the target address. This includes all instruction bytes 106 fetched from the instruction cache 102 that may be waiting in buffers of the fetch unit 104 to be decrypted and the decode unit 108 to be decoded. Flow proceeds to block 1018.

At block 1018, as a result of the branch to the target address at block 1016, the fetch unit 104 begins fetching and decrypting instruction data 106 from the instruction cache 102 using the new set of key values loaded into the master key registers 142 at block 1014. Flow ends at block 1018.

Referring now to FIG. 11, a flowchart illustrating operation of a post-processor, which is a software utility that may be employed to post-process a program and encrypt it for execution by the microprocessor 100 of FIG. 1 according to the present invention is shown. Flow begins at block 1102.

At block 1102, the post-processor receives an object file of a program. According to one embodiment, the object file includes only branch instructions whose target address may be determined before run-time of the program, such as a branch instruction that specifies a fixed target address. Another type of branch instruction whose target address may be determined before run-time of the program, for example, is a relative branch instruction that includes an offset that is added to the branch instruction's memory address to calculate the branch target address. In contrast, an example of a branch instruction whose target address may not be determined before run-time of the program is branch instruction whose target address is calculated from operands in registers or memory that may change during execution of the program. Flow proceeds to block 1104.

At block 1104, the post-processor replaces each inter-chunk branch instruction with a branch and switch key instruction 900 having an appropriate key register file index field 904 value based on the chunk into which the target address of the branch instruction falls. As described above with respect to FIG. 8, a chunk is a sequence of instruction data bytes that are to be decrypted with the same set of master key register 142 values. Thus, an inter-chunk branch instruction is a branch instruction whose target address is within a chunk that is different than the chunk which contains the branch instruction itself. It is noted that intra-chunk branches, i.e., branches whose target address is within the same chunk that contains the branch instruction itself, need not be replaced. It is noted that the programmer and/or compiler that creates the source file from which the object file is generated may explicitly include the branch and switch key instructions 900 as needed, thereby alleviating the need for the post-processor to do so. Flow proceeds to block 1106.

At block 1106, the post-processor encrypts the program. The post-processor is aware of the memory location and master key register 142 values associated with each chunk, which it uses to encrypt the program. Flow ends at block 1106.

Referring now to FIG. 12, a block diagram illustrating the format of a branch and switch key instruction 1200 according to an alternate embodiment of the present invention is shown. Advantageously, the branch and switch key instruction 1200 of FIG. 12 accommodates branching when the target address is not known pre-run-time, as discussed in more detail below. The branch and switch key instruction 1200 includes an opcode 1202 field that uniquely identifies the branch and switch key instruction 1200 within the instruction set of the microprocessor 100. The branch and switch key instruction 1200 also includes a branch information field 906 similar to the same field in the branch and switch key instruction 900 of FIG. 9. In one embodiment, if a program attempts to execute a branch and switch key instruction 1200 when the microprocessor 100 is not in secure execution mode, an invalid instruction exception is taken. In one embodiment, if a program attempts to execute a branch and switch key instruction 1200 when the microprocessor 100 is not in the highest privilege level (e.g., x86 ring 0), an invalid instruction exception is taken. In one embodiment, the branch and switch key instruction 1200 is atomic.

Referring now to FIG. 13, a block diagram illustrating a chunk address range table 1300 according to the present invention is shown. The table 1300 includes a plurality of entries. Each entry is associated with a different chunk of the encrypted program. Each entry includes an address range field 1302 and a key register file index field 1304. The address range field 1302 specifies the memory address range of the chunk. The key register file index field 1304 specifies the index into the key register file 124 of the registers storing the key values that must be loaded by the branch and switch key instruction 1200 into the master key register 142 to be used by the fetch unit 104 to decrypt the chunk. As discussed below with respect to FIG. 18, the table 1300 is loaded into the microprocessor 100 before a branch and switch key instruction 1200 is executed that requires access to the table 1300.

Referring now to FIG. 14, a flowchart illustrating operation of the microprocessor 100 of FIG. 1 to perform the branch and switch key instruction 1200 of FIG. 12 according to the present invention is shown. Flow begins at block 1402.

At block 1402, the decode unit 108 decodes a branch and switch key instruction 1200 and traps to the microcode routine in the microcode unit 132 that implements the branch and switch key instruction 1200. Flow proceeds to block 1404.

At block 1406, the microcode resolves the branch direction (i.e., taken or not taken) and target address. Flow proceeds to decision block 1408.

At decision block 1408, the microcode determines whether the direction resolved at block 1406 is taken. If so, flow proceeds to block 1414; otherwise, flow proceeds to block 1412.

At block 1412, the microcode does not switch keys or branch to the target address, since the branch was not taken. Flow ends at block 1412.

At block 1414, the microcode looks up the target address resolved at block 1406 in the table 1300 of FIG. 13 to obtain the key register file index field 1304 value of the chunk into which the target address falls. The microcode then loads the master key registers 142 from the key register file 124 based on the key register file index field 1304. Preferably, the microcode loads n keys into the master key registers 142 from n adjacent registers of the key register file 124 at the key register file index field 1304 value, where n is the number of master key registers 142. In one embodiment, n may be specified within an additional field of the branch and switch key instruction 1200 to be less than the number of master key registers 142. Flow proceeds to block 1416.

At block 1416, the microcode causes the microprocessor 100 to branch to the target address resolved at block 1406 and causes all x86 instructions in the microprocessor 100 to be flushed that are newer than the branch and switch key instruction 1200 and which causes all micro-ops in the microprocessor 100 to be flushed that are newer than the micro-op that branches to the target address. This includes all instruction bytes 106 fetched from the instruction cache 102 that may be waiting in buffers of the fetch unit 104 to be decrypted and the decode unit 108 to be decoded. Flow proceeds to block 1418.

At block 1418, as a result of the branch to the target address at block 1416, the fetch unit 104 begins fetching and decrypting instruction data 106 from the instruction cache 102 using the new set of key values loaded into the master key registers 142 at block 1414. Flow ends at block 1418.

Referring now to FIG. 15, a block diagram illustrating the format of a branch and switch key instruction 1500 according to an alternate embodiment of the present invention is shown. The branch and switch key instruction 1500 of FIG. 15 and its operation is similar to the branch and switch key instruction 1200 of FIG. 12; however, rather than loading the master key registers 142 from the key register file 124, the branch and switch key instruction 1500 loads the master key registers 142 from the secure memory area 122, as described below.

Referring now to FIG. 16, a block diagram illustrating a chunk address range table 1600 according to the present invention is shown. The table 1600 of FIG. 16 is similar to the table 1300 of FIG. 13; however, rather than a key register index field 1304, the table 1600 includes an SMA address field 1604. The SMA address field 1604 specifies the address within the secure memory area 122 of the locations storing the key values that must be loaded by the branch and switch key instruction 1500 into the master key register 142 to be used by the fetch unit 104 to decrypt the chunk. As discussed below with respect to FIG. 18, the table 1600 is loaded into the microprocessor 100 before a branch and switch key instruction 1500 is executed that requires access to the table 1600. In one embodiment, many of the lower bits of the secure memory area 122 address need not be stored in the SMA address field 1604, particularly since the number of locations in the secure memory area 122 storing the set of keys is large (e.g., 16 bytes×5) and the set may be aligned on a set-size boundary.

Referring now to FIG. 17, a flowchart illustrating operation of the microprocessor 100 of FIG. 1 to perform the branch and switch key instruction 1500 of FIG. 15 according to the present invention is shown. Flow begins at block 1702. Most of the blocks of the flowchart of FIG. 17 are similar to the blocks of FIG. 14 and are thus similarly numbered. However, block 1414 is replaced with block 1714 in which the microcode looks up the target address resolved at block 1406 in the table 1600 of FIG. 16 to obtain the SMA address field 1604 value of the chunk into which the target address falls. The microcode then loads the master key registers 142 from the secure memory area 122 based on the SMA address field 1604 value. Preferably, the microcode loads n keys into the master key registers 142 from n adjacent 16-byte locations of the secure memory area 122 at the SMA address field 1604 value, where n is the number of master key registers 142. In one embodiment, n may be specified within an additional field of the branch and switch key instruction 1500 to be less than the number of master key registers 142.

Figure 18:
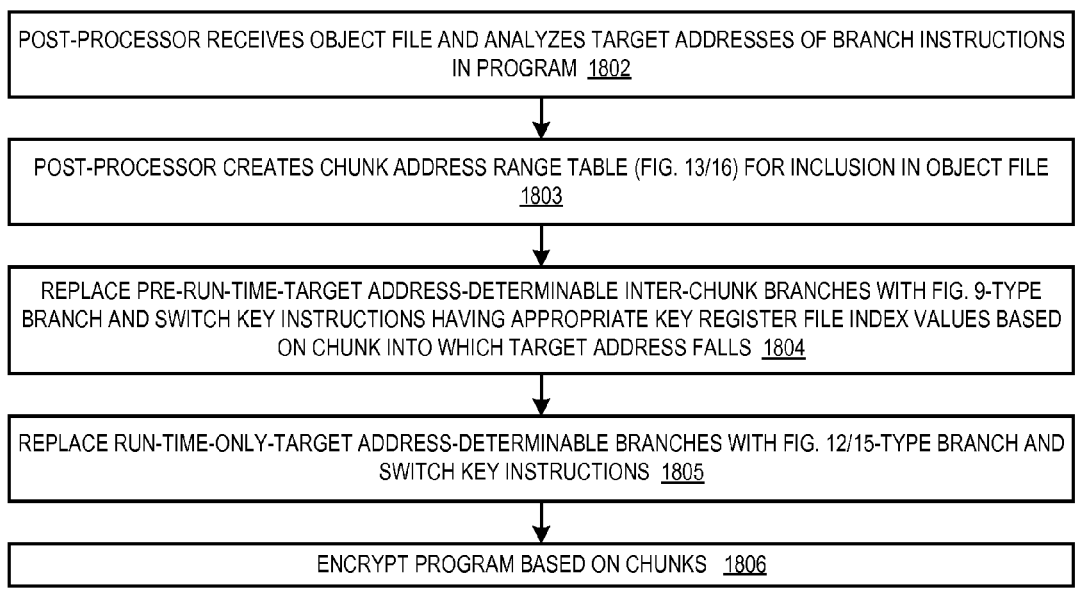
FIG. 18 is a flowchart illustrating operation of a post-processor that may be employed to post-process a program and encrypt it for execution by the microprocessor of FIG. 1 according to an alternate embodiment of the present invention.

Referring now to FIG. 18, a flowchart illustrating operation of a post-processor that may be employed to post-process a program and encrypt it for execution by the microprocessor 100 of FIG. 1 according to an alternate embodiment of the present invention is shown. Flow begins at block 1802.

At block 1802, the post-processor receives an object file of a program. According to one embodiment, the object file includes branch instructions whose target address may be determined before run-time of the program as well as branch instructions whose target address may not be determined before run-time of the program. Flow proceeds to block 1803.

At block 1803, the post-processor creates a chunk address range table 1300 of FIG. 13 or 1600 of FIG. 16 for inclusion in the object file. In one embodiment, the operating system loads the table 1300/1600 into the microprocessor 100 prior to loading and running the encrypted program so that the branch and switch key instructions 1200/1500 may have access to it. In one embodiment, the post-processor inserts instructions into the program that load the table 1300/1600 into the microprocessor 100 before any branch and switch key instructions 1200/1500 are executed. Flow proceeds to block 1804.

At block 1804, similar to the operation described above with respect to block 1104 of FIG. 11, the post-processor replaces each pre-run-time-target address-determinable inter-chunk branch instruction with a branch and switch key instruction 900 of FIG. 9 having an appropriate key register file index field 904 value based on the chunk into which the target address of the branch instruction falls. Flow proceeds to block 1805.

At block 1805, the post-processor replaces each run-time-only-target address-determinable branch instruction with a branch and switch key instruction 1200 of FIG. 12 or 1500 of FIG. 15, depending upon which type of table 1300/1600 was created at block 1803. Flow proceeds to block 1806.

At block 1806, the post-processor encrypts the program. The post-processor is aware of the memory location and master key register 142 values associated with each chunk, which it uses to encrypt the program. Flow ends at block 1806.

Figure 19:
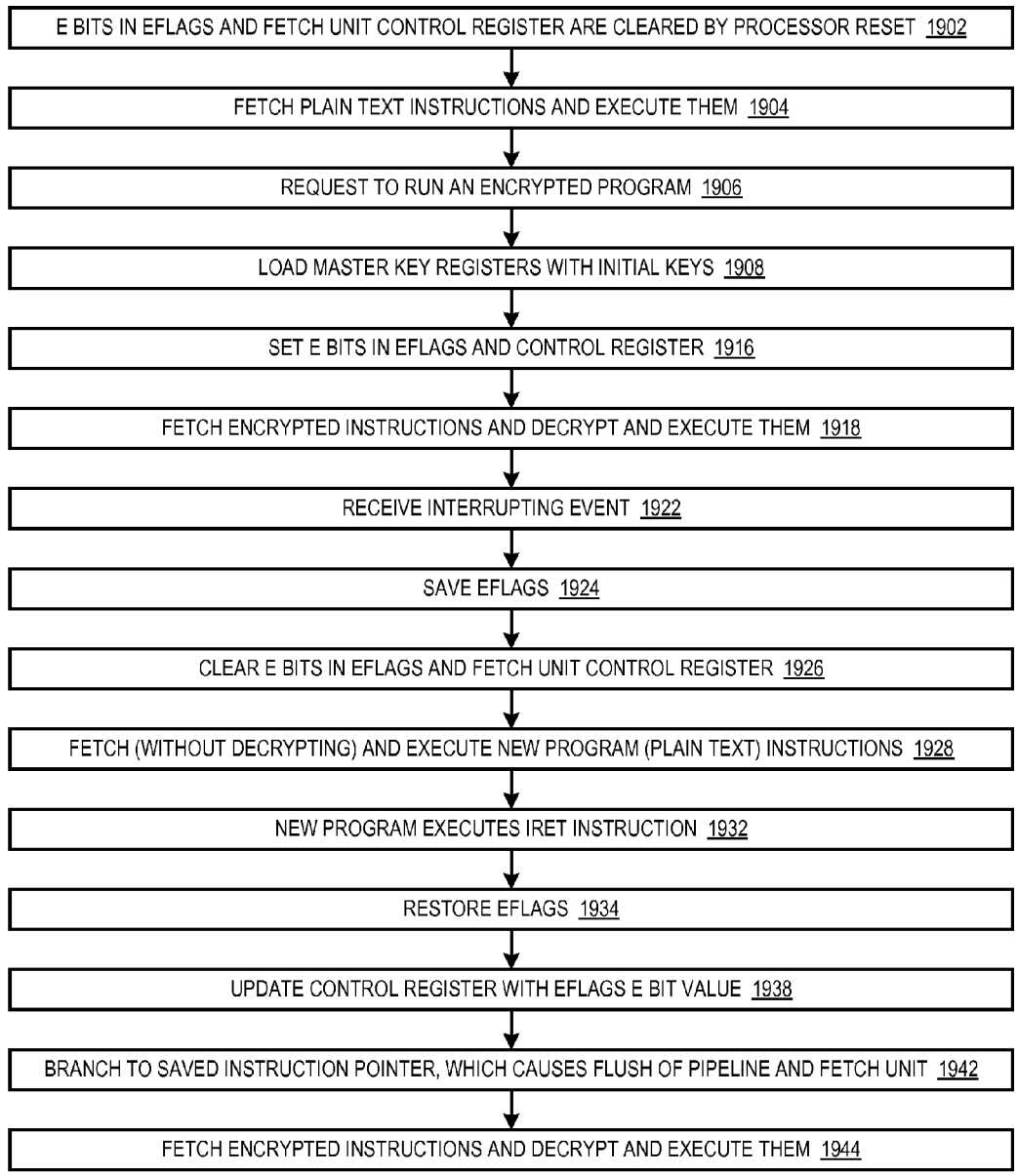
FIG. 19 is a flowchart illustrating operation of the microprocessor of FIG. 1 to accommodate task switching between an encrypted program and a plain text program according to the present invention.

Referring now to FIG. 19, a flowchart illustrating operation of the microprocessor 100 of FIG. 1 to accommodate task switching between an encrypted program and a plain text program according to the present invention is shown. Flow begins at block 1902.

At block 1902, the E bit 402 of the EFLAGS register 128 and the E bit 148 of the control register 144 of FIG. 1 are cleared by a reset of the microprocessor 100. Flow proceeds to block 1904.

At block 1904, after executing its reset microcode that performs its initialization, the microprocessor 100 begins fetching and executing user program instructions, such as system firmware, which are plain text program instructions. In particular, because the E bit 148 is clear, the fetch unit 104 treats the fetched instruction data 106 as plain text instructions, as described above. Flow proceeds to block 1906.

At block 1906, system software (such as the operating system, firmware, BIOS, etc.) receives a request to run an encrypted program. In one embodiment, the request to run an encrypted program is accompanied by or indicated by a switch to the secure execution mode of the microprocessor 100, discussed above. In one embodiment, the microprocessor 100 is only allowed to operate in decryption mode (i.e., with the E bit 148 set) when operating in the secure execution mode. In one embodiment, the microprocessor 100 is only allowed to operate in decryption mode when operating in a system management mode, such as the well-known SMM of the x86 architecture. Flow proceeds to block 1908.

At block 1908, the system software loads the master key registers 142 with their initial values associated with the first chunk of the program that will execute.

In one embodiment, the system software executes a switch key instruction 600 to load the master key registers 142. Prior to loading of the master key registers 142, the key register file 124 may be loaded using one or more load key instructions 400. In one embodiment, prior to the loading of the master key registers 142 and key register file 124, the secure memory area 122 may be written with key values via a secure channel according to well-known techniques, such as an AES- or RSA-encrypted channel, to avoid snooping of the values by an attacker. As discussed above, the values may be stored in a secure non-volatile memory, such as a flash memory, coupled to the microprocessor 100 via a private serial bus, or stored in a non-volatile write-once memory of the microprocessor 100. As discussed above, the program may be included in a single chunk. That is, the program may include no switch key instructions 600 such that the entire program is decrypted with a single set of master key register 142 values. Flow proceeds to block 1916.

At block 1916, as control is transferred to the encrypted program, the microprocessor 100 sets the EFLAGS register 128 E bit 402 to indicate that the currently executing program is encrypted, and sets the control register 144 E bit 148 to place the fetch unit 104 in decryption mode. The microprocessor 100 also causes the pipeline to be flushed of instructions, similar to the flush operation performed at block 706 of FIG. 7. Flow proceeds to block 1918.

At block 1918, the fetch unit 104 fetches the instructions 106 of the encrypted program and decrypts and executes them in decryption mode as described above with respect to FIGS. 1 through 3. Flow proceeds to block 1922.

At block 1922, as the microprocessor 100 is fetching and executing the encrypted program, the microprocessor 100 receives an interrupting event. The interrupting event may be an interrupt, an exception (such as a page fault), or a task switch, for example. When an interrupting event occurs, all pending instructions within the microprocessor 100 pipeline are flushed. Therefore, if there are any instructions in the pipeline that were fetched as encrypted instructions, they are flushed. Furthermore, all instruction bytes fetched from the instruction cache 102 that may be waiting in buffers of the fetch unit 104 to be decrypted and the decode unit 108 to be decoded are flushed. In one embodiment, microcode is invoked in response to the interrupting event. Flow proceeds to block 1924.

At block 1924, the microprocessor 100 saves the EFLAGS register 128 (along with the other architectural state of the microprocessor 100, including the current instruction pointer value of the interrupted encrypted program) to a stack memory. Advantageously, the E bit 402 value of the encrypted program is saved so that it may be subsequently restored (at block 1934). Flow proceeds to block 1926.

At block 1926, as control is transferred to the new program (e.g., interrupt handler, exception handler, or new task), the microprocessor 100 clears the EFLAGS register 128 E bit 402 and the control register 144 E bit 148, since the new program is a plain text program. That is, the embodiment of FIG. 19 assumes only one encrypted program is allowed to run at a time on the microprocessor 100 and an encrypted program was already running, i.e., was interrupted. However, see FIGS. 21 through 26 for a description of alternate embodiments. Flow proceeds to block 1928.

At block 1928, the fetch unit 104 fetches the instructions 106 of the new program in plain text mode as described above with respect to FIGS. 1 through 3. In particular, the clear value of the control register 144 E bit 148 controls mux 154 such that the instruction data 106 is XORed with the zeroes 176 such that the instruction data 106 is not decrypted. Flow proceeds to block 1932.

At block 1932, the new program executes a return from interrupt instruction (e.g., x86 IRET) or similar instruction to cause control to return to the encrypted program. In one embodiment, the return from interrupt instruction is implemented in microcode. Flow proceeds to block 1934.

At block 1934, in response to the return from interrupt instruction, as control is transferred back to the encrypted program, the microprocessor 100 restores the EFLAGS register 128, thereby restoring the EFLAGS register 128 E bit 402 to a set value that was saved at block 1924. Flow proceeds to block 1938.

At block 1938, as control is transferred back to the encrypted program, the microprocessor 100 updates the control register 144 E bit 148 with the value from the EFLAGS register 128 E bit 402, i.e., with a set value, such that the fetch unit 104 re-commences fetching and decrypting the encrypted program instruction data 106. Flow proceeds to block 1942.

At block 1942, the microcode causes the microprocessor 100 to branch to the instruction pointer value that was saved onto the stack at block 1924, which causes all x86 instructions in the microprocessor 100 to be flushed and which causes all micro-ops in the microprocessor 100 to be flushed. This includes all instruction bytes 106 fetched from the instruction cache 102 that may be waiting in buffers of the fetch unit 104 to be decrypted and the decode unit 108 to be decoded. Flow proceeds to block 1944.

At block 1944, the fetch unit 104 resumes fetching the instructions 106 of the encrypted program and decrypting and executing them in decryption mode as described above with respect to FIGS. 1 through 3. Flow ends at block 1944.

Figure 20:
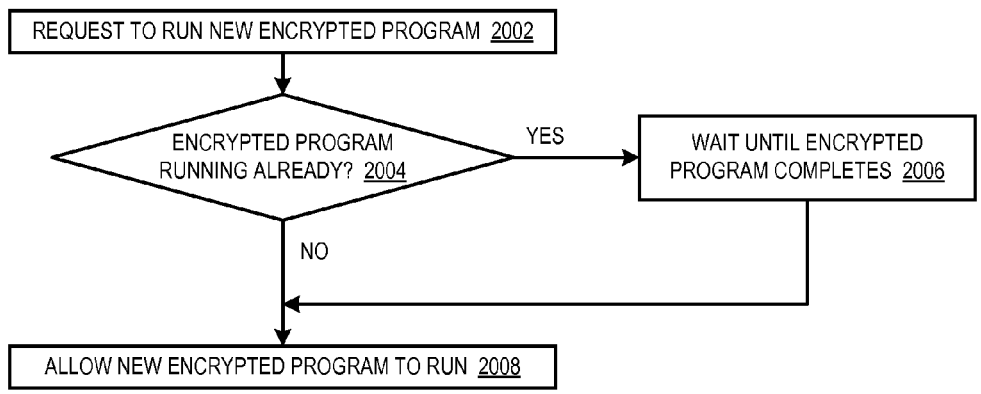
FIG. 20 is a flowchart illustrating operation of system software running on the microprocessor of FIG. 1 according to the present invention.

Referring now to FIG. 20, a flowchart illustrating operation of system software running on the microprocessor 100 of FIG. 1 according to the present invention is shown. FIG. 20 accompanies the embodiment of FIG. 19. Flow begins at block 2002.

At block 2002, a request is made to the system software to run a new encrypted program. Flow proceeds to decision block 2004.

At decision block 2004, the system software determines whether an encrypted program is already one of the running programs in the system. In one embodiment, the system software maintains a flag to indicate whether an encrypted program is already one of the running programs in the system. If an encrypted program is already one of the running programs in the system, flow proceeds to block 2006; otherwise, flow proceeds to block 2008.

At block 2006, the system software waits until the encrypted program completes and is no longer one of the running programs in the system. Flow proceeds to block 2008.

At block 2008, the microprocessor 100 allows the new encrypted program to run. Flow ends at block 2008.

Figure 21:
FIG. 21 is a block diagram illustrating the fields of the EFLAGS register of FIG. 1 according to an alternate embodiment of the present invention.

Referring now to FIG. 21, a block diagram illustrating the fields of the EFLAGS register 128 of FIG. 1 according to an alternate embodiment of the present invention is shown. The EFLAGS register 128 of FIG. 21 is similar to the embodiment of FIG. 4; however, the embodiment of FIG. 21 also includes index bits 2104. According to one embodiment, the index bits 2104, like the E bit 402, comprise bits that are conventionally RESERVED by the x86 architecture. The index field 2104 accommodates switching between multiple encrypted programs, as described below. Preferably, the switch key instruction 600 and branch and switch key instructions 900/1200 update the EFLAGS register 128 index field 2104 with the value specified in the respective key register file index field 604/904/1304.

Figure 22:
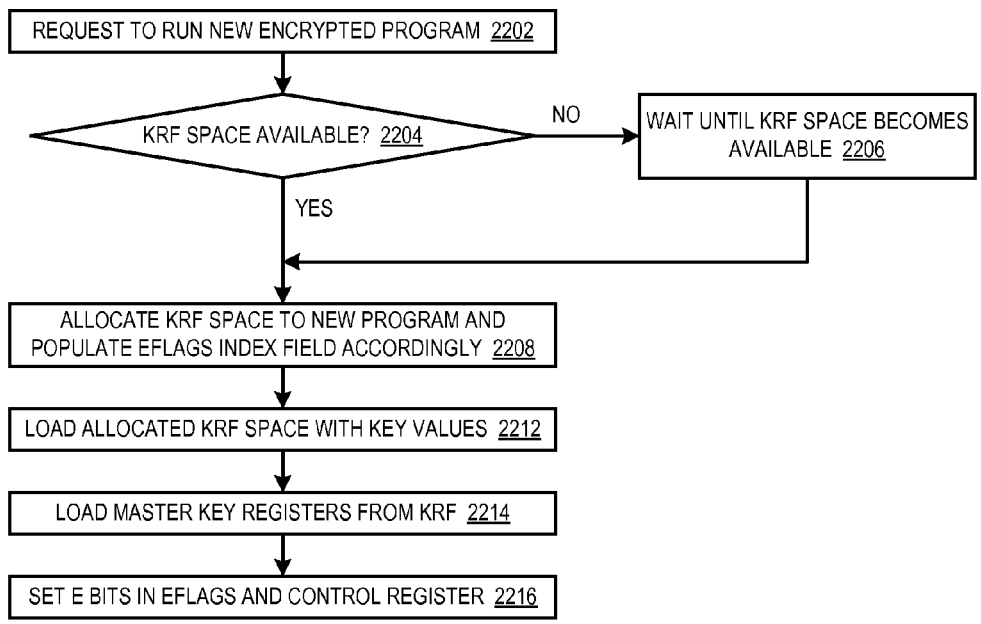
FIG. 22 is a flowchart illustrating operation of the microprocessor of FIG. 1 having an EFLAGS register according to FIG. 21 to accommodate task switching between multiple encrypted programs according to the present invention.

Referring now to FIG. 22, a flowchart illustrating operation of the microprocessor 100 of FIG. 1 having an EFLAGS register 128 according to FIG. 21 to accommodate task switching between multiple encrypted programs according to the present invention is shown. Flow begins at block 2202.

At block 2202, a request is made to the system software to run a new encrypted program. Flow proceeds to decision block 2204.

At decision block 2204, the system software determines whether there is space available in the key register file 124 to accommodate a new encrypted program. In one embodiment, the request made at block 2202 specifies the amount of space needed in the key register file 124. If there is space available in the key register file 124 to accommodate the new encrypted program, flow proceeds to block 2208; otherwise, flow proceeds to block 2206.

At block 2206, the system software waits until there is space available in the key register file 124 to accommodate the new encrypted program by waiting until one or more encrypted programs complete. Flow proceeds to block 2208.

At block 2208, the system software allocates the space in the key register file 124 to the new encrypted program and populates the index field 2104 in the EFLAGS register 128 accordingly to indicate the location of the newly allocated space in the key register file 124. Flow proceeds to block 2212.

At block 2212, the system software loads the key register file 124 locations allocated at block 2208 with the key values for the new program. As discussed above, this may be from the secure memory area 122 using the load key instruction 400 or, if necessary, from a location outside the microprocessor 100 in a secure manner. Flow proceeds to block 2214.

At block 2214, the system software loads the master key registers 142 from the key register file 124 based on the key register file index field 604/904/1304. In one embodiment, the system software executes a switch key instruction 600 to load the master key registers 142. Flow proceeds to block 2216.

At block 2216, as control is transferred to the encrypted program, the microprocessor 100 sets the EFLAGS register 128 E bit 402 to indicate that the currently executing program is encrypted, and sets the control register 144 E bit 148 to place the fetch unit 104 in decryption mode. Flow ends at block 2216.

Figure 23:
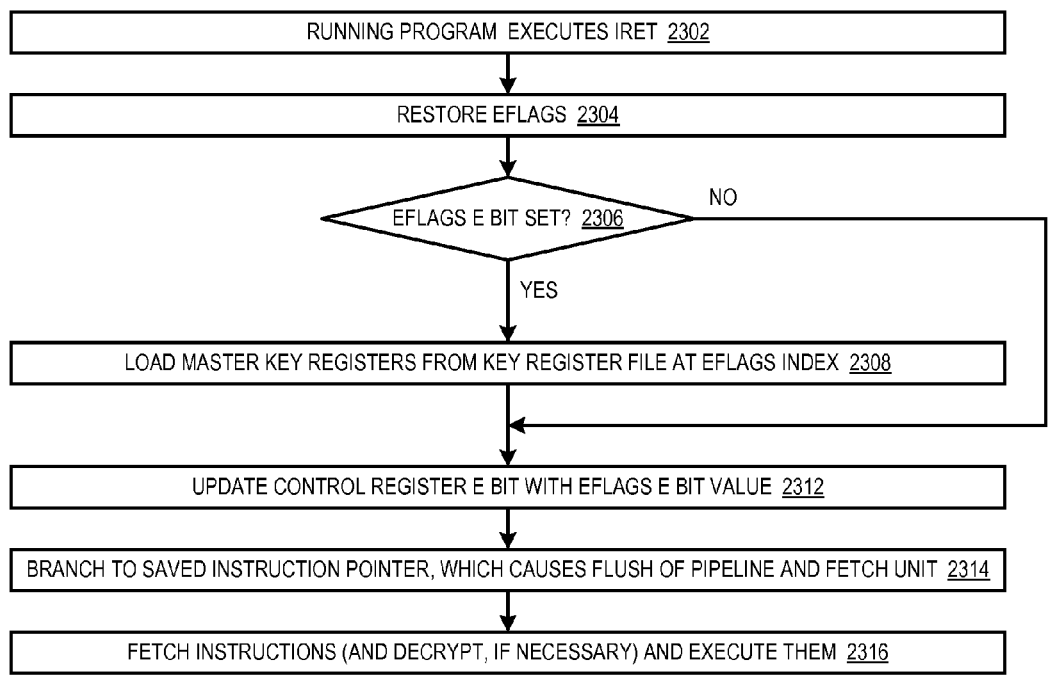
FIG. 23 is a flowchart illustrating operation of the microprocessor of FIG. 1 having an EFLAGS register according to FIG. 21 to accommodate task switching between multiple encrypted programs according to the present invention.

Referring now to FIG. 23, a flowchart illustrating operation of the microprocessor 100 of FIG. 1 having an EFLAGS register 128 according to FIG. 21 to accommodate task switching between multiple encrypted programs according to the present invention is shown. Flow begins at block 2302.

At block 2302, a currently running program executes a return from interrupt instruction to cause a task switch to occur to a new program that was previously executing but was swapped out and whose architectural state (e.g., EFLAGS register 128, instruction pointer register, and general purpose registers) was saved onto a stack in memory. As mentioned above, in one embodiment, the return from interrupt instruction is implemented in microcode. The currently running program and the new program may be an encrypted program or a plain text program. Flow proceeds to block 2304.

At block 2304, the microprocessor 100 restores from the stack in memory the EFLAGS register 128 for the new program. That is, the microprocessor 100 loads the EFLAGS register 128 with the EFLAGS register 128 value that was previously saved onto the stack when the new program (i.e., the program now being swapped back in) was swapped out. Flow proceeds to decision block 2306.

At decision block 2306, the microprocessor 100 determines whether the E bit 402 in the restored EFLAGS register 128 is set. If so, flow proceeds to block 2308; otherwise, flow proceeds to block 2312.

At block 2308, the microprocessor 100 loads the master key registers 142 from the key register file 124 based on the EFLAGS register 128 index field 2104 value that was restored at block 2304. Flow proceeds to block 2312.

At block 2312, the microprocessor 100 updates the control register 144 E bit 148 with the EFLAGS register 128 E bit 402 value that was restored at block 2304. Thus, if the new program is an encrypted program, the fetch unit 104 will be placed in decryption mode and otherwise it will be placed in plain text mode. Flow proceeds to block 2314.

At block 2314, the microprocessor 100 restores the instruction pointer register with the value from the stack in memory and causes a branch to the instruction pointer value, which causes all x86 instructions in the microprocessor 100 to be flushed and which causes all micro-ops in the microprocessor 100 to be flushed. This includes all instruction bytes 106 fetched from the instruction cache 102 that may be waiting in buffers of the fetch unit 104 to be decrypted and the decode unit 108 to be decoded. Flow proceeds to block 2316.

At block 2316, the fetch unit 104 resumes fetching the instructions 106 of the new program as described above with respect to FIGS. 1 through 3, either in decryption mode or plain text mode according to the value of the control register 144 E bit 148 restored at block 2312. Flow ends at block 2316.

Figure 24:
FIG. 24 is a block diagram illustrating a single register of the key register file of FIG. 1 according to an alternate embodiment of the present invention.

Referring now to FIG. 24, a block diagram illustrating a single register of the key register file 124 of FIG. 1 according to an alternate embodiment of the present invention is shown. According to the embodiment of FIG. 24, each key register file 124 further includes a bit, referred to as the kill (K) bit 2402. The K bit 2402 accommodates multitasking by the microprocessor 100 between multiple encrypted programs that collectively require more space than the size of the key register file 124 space, as described in more detail below.

Figure 25:
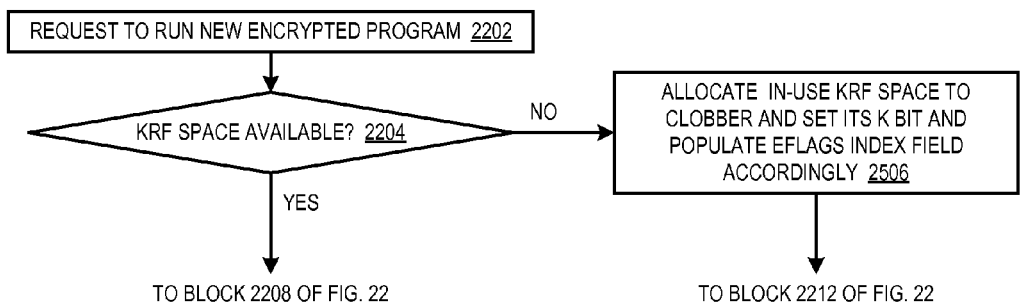
FIG. 25 is a flowchart illustrating operation of the microprocessor of FIG. 1 having an EFLAGS register according to FIG. 21 and a key register file according to FIG. 24 to accommodate task switching between multiple encrypted programs according to an alternate embodiment of the present invention.

Referring now to FIG. 25, a flowchart illustrating operation of the microprocessor 100 of FIG. 1 having an EFLAGS register 128 according to FIG. 21 and a key register file 124 according to FIG. 24 to accommodate task switching between multiple encrypted programs according to an alternate embodiment of the present invention is shown. The flowchart of FIG. 25 is similar to the flowchart of FIG. 22; however, if it is determined at decision block 2204 that there is no space available in the key register file 124, flow proceeds to block 2506 rather than to block 2206 which does not exist in FIG. 25; otherwise, flow proceeds to blocks 2208 through 2216 of FIG. 22.

At block 2506, the system software allocates space (i.e., registers) within the key register file 124 that is already in use by (i.e., has already been allocated to) another encrypted program and sets the K bit 2402 of the allocated registers and populates the index field 2104 in the EFLAGS register 128 accordingly to indicate the location of the newly allocated space in the key register file 124. The K bit 2402 is set because the key values of the other encrypted program in the allocated registers will be clobbered at block 2212 with the new values of the new encrypted program. However, advantageously as described below with respect to FIG. 26, the key values of the other encrypted program will be re-loaded at block 2609 when the other encrypted program is swapped back in. Flow proceeds from block 2506 to blocks 2212 through 2216 of FIG. 22.

Figure 26:
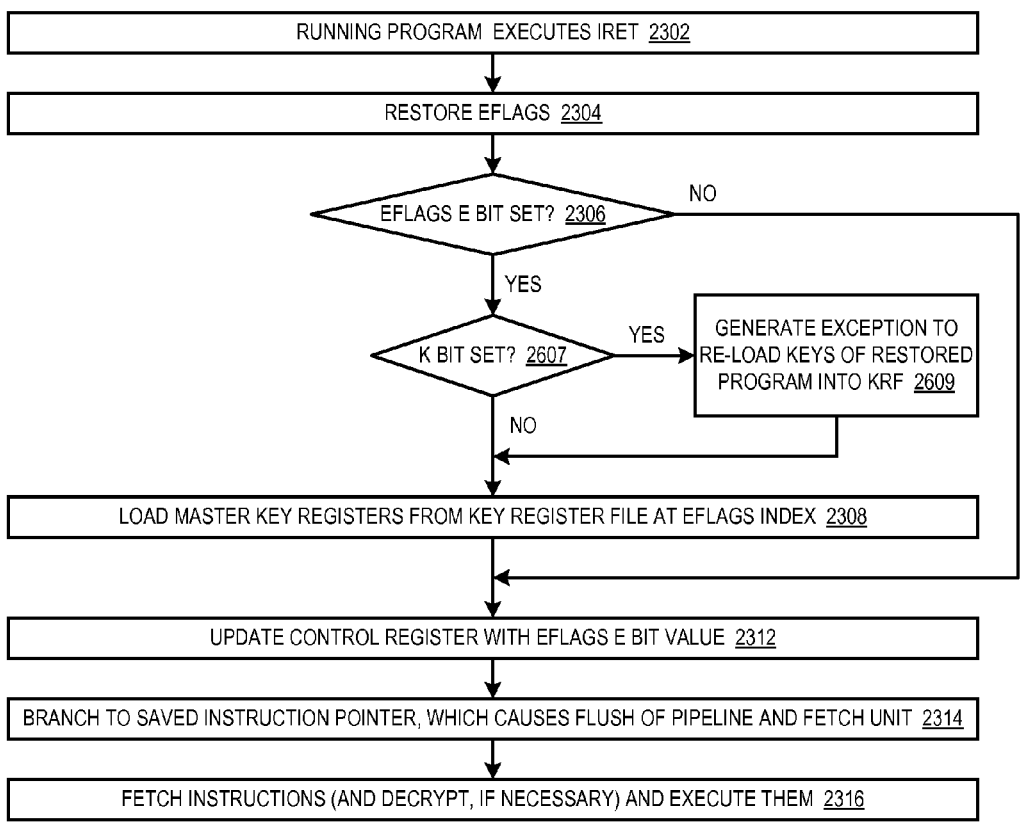
FIG. 26 is a flowchart illustrating operation of the microprocessor of FIG. 1 having an EFLAGS register according to FIG. 21 and a key register file according to FIG. 24 to accommodate task switching between multiple encrypted programs according to an alternate embodiment of the present invention.

Referring now to FIG. 26, a flowchart illustrating operation of the microprocessor 100 of FIG. 1 having an EFLAGS register 128 according to FIG. 21 and a key register file 124 according to FIG. 24 to accommodate task switching between multiple encrypted programs according to an alternate embodiment of the present invention is shown. The flowchart of FIG. 26 is similar to the flowchart of FIG. 23; however, if it is determined at decision block 2306 that the EFLAGS register 128 E bit 402 is set, flow proceeds to decision block 2607 rather than to block 2308.

At decision block 2607, the microprocessor 100 determines whether the K bit 2402 of any of the key register file 124 registers specified by the EFLAGS register 128 index field 2104 value (which was restored at block 2304) are set. If so, flow proceeds to block 2609; otherwise, flow proceeds to block 2308.

At block 2609, the microprocessor 100 generates an exception to an exception handler. In one embodiment, the exception handler is included in the system software. In one embodiment, the exception handler is provided by the secure execution mode (SEM) architecture. The exception handler re-loads the keys of the restored encrypted program (i.e., the encrypted program that is now being swapped back in) into the key register file 124 based on the EFLAGS register 128 index field 2104 value that was restored at block 2304. The exception handler may function similar to the manner described above with respect to block 1908 of FIG. 19 to load the keys of the restored encrypted program into the key register file 124 and, if necessary, into the secure memory area 122 from outside the microprocessor 100. Additionally, if the key register file 124 registers that are being re-loaded are still in use by another encrypted program, the system software sets the K bit 2402 of the re-loaded registers. Flow proceeds from block 2609 to block 2308, and blocks 2308 through 2316 are similar to those of FIG. 23.

As may be observed from FIGS. 24 through 26, the embodiment described therein advantageously enables the microprocessor 100 to multitask between multiple encrypted programs that collectively require more space than the size of the key register file 124 space.

Figure 27:
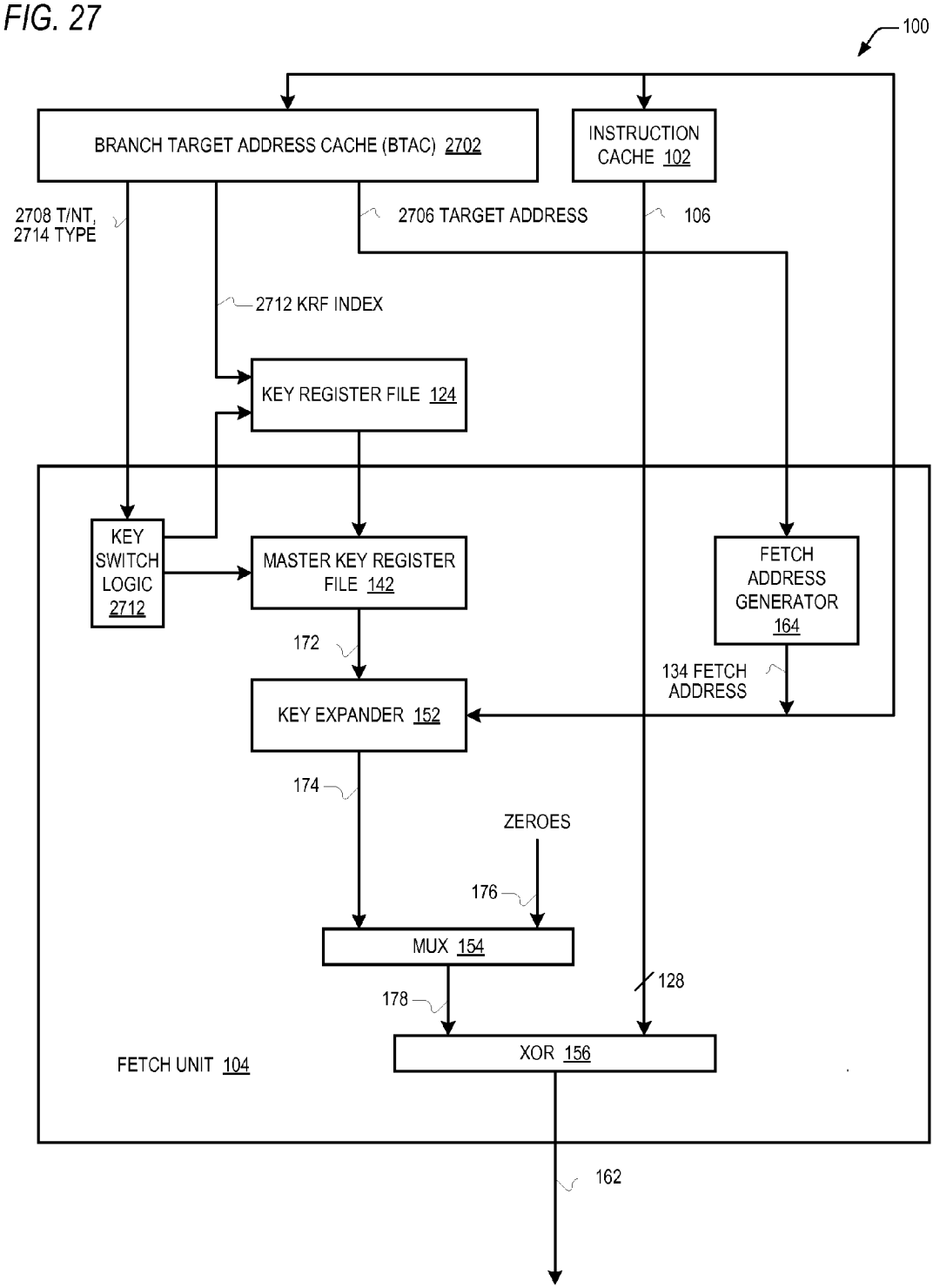
FIG. 27 is a block diagram illustrating portions of the microprocessor of FIG. 1 according to an alternate embodiment of the present invention.

Referring now to FIG. 27, a block diagram illustrating portions of the microprocessor 100 of FIG. 1 according to an alternate embodiment of the present invention is shown. Like numbered elements to FIG. 1 are similar, specifically the instruction cache 102, fetch unit 104, and key register file 124. However, the fetch unit 104 is modified to include key switch logic 2712 that is coupled to the master key register file 142 and to the key register file 124 of FIG. 1. The microprocessor 100 of FIG. 27 also includes a branch target address cache (BTAC) 2702. The BTAC 2702 receives the fetch address 134 of FIG. 1 and is accessed in parallel with the access of the instruction cache 102 by the fetch address 134. In response to the fetch address 134, the BTAC 2702 provides a branch target address 2706 to the fetch address generator 164 of FIG. 1; provides a taken/not taken (T/NT) indicator 2708 and a type indicator 2714 to the key switch logic 2712; and provides a key register file (KRF) index 2712 to the key register file 124.

Figure 28:
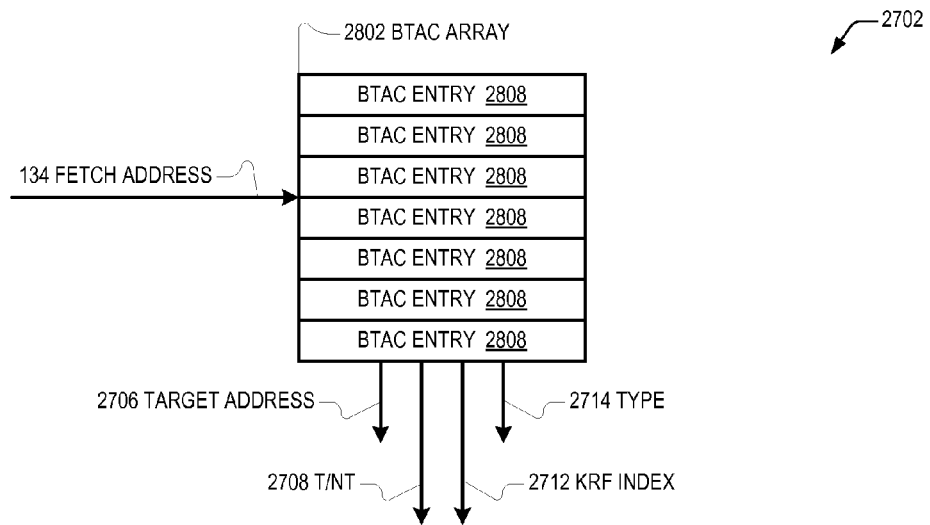
FIG. 28 is a block diagram illustrating in more detail the BTAC of FIG. 27 according to the present invention.

Referring now to FIG. 28, a block diagram illustrating in more detail the BTAC 2702 of FIG. 27 according to the present invention is shown. The BTAC 2702 includes a BTAC array 2802 comprising a plurality of BTAC entries 2808, whose contents are described with respect to FIG. 29. The BTAC 2802 caches information concerning the history of previously executed branch instructions in order to make predictions about the direction and target address of the branch instructions on subsequent executions thereof. More specifically, the BTAC 2802 makes predictions on subsequent fetches of the previously executed branch instructions based on the fetch address 134 using the cached history information. The operation of branch target address caches is well-known in the art of branch prediction. However, advantageously, the BTAC 2802 according to the present invention is modified to cache information concerning the history of previously executed branch and switch key instructions 900/1200 in order to make predictions about them. More specifically, the cached history information enables the BTAC 2802 to predict at fetch time the set of values that a fetched branch and switch key instruction 900/1200 will load in the master key register 142. This advantageously enables the switch key logic 2712 to load the values before the branch and switch key instruction 900/1200 is actually executed, which avoids having to flush the microprocessor 100 pipeline upon execution of the branch and switch key instruction 900/1200, as described in more detail below. Furthermore, according to one embodiment, the BTAC 2802 is also modified to cache information concerning the history of previously executed switch key instructions 600 to a similar advantage.

Figure 29:
FIG. 29 is a block diagram illustrating in more detail the contents of a BTAC entry of FIG. 28 according to the present invention.

Referring now to FIG. 29, a block diagram illustrating in more detail the contents of a BTAC entry 2808 of FIG. 28 according to the present invention is shown. Each entry 2808 includes a valid bit 2902 for indicating whether the entry 2808 is valid. Each entry 2808 also includes a tag field 2904 for comparing with a portion of the fetch address 134. If the index portion of the fetch address 134 selects an entry 2808 whose tag portion of the fetch address 134 matches the tag 2904 that is valid, then the fetch address 134 hits in the BTAC 2802. Each entry 2808 also includes a target address field 2906 used for caching target addresses of previously executed branch instructions, including branch and switch key instructions 900/1200. Each entry 2808 also includes a taken/not taken (T/NT) field 2908 used for caching direction history of previously executed branch instructions, including branch and switch key instructions 900/1200. Each entry 2808 includes a key register file index field 2912 used for caching the key register file index 904/1304 history of previously executed branch and switch key instructions 900/1200, as described in more detail below. According to one embodiment, the BTAC 2802 also caches in the key register file index 2912 field the key register file index 604 history of previously executed switch key instructions 600. Each entry 2808 also includes a type field 2914 that indicates the type of instruction that was previously executed and for which its history information is cached in the entry 2808. For example, the type field 2914 may indicate whether the instruction is a call, return, conditional jump, unconditional jump, branch and switch key instruction 900/1200, or switch key instruction 600.

Figure 30:
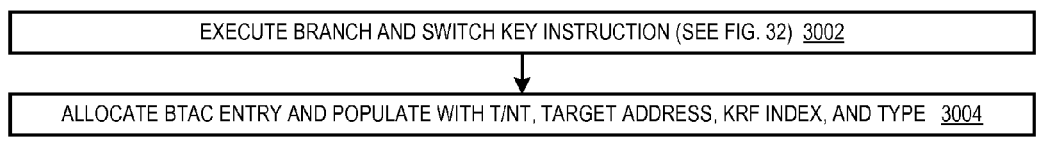
FIG. 30 is a flowchart illustrating operation of the microprocessor of FIG. 27 including the BTAC of FIG. 28 according to the present invention.

Referring now to FIG. 30, a flowchart illustrating operation of the microprocessor 100 of FIG. 27 including the BTAC 2802 of FIG. 28 according to the present invention is shown. Flow begins at block 3002.

Figure 32:
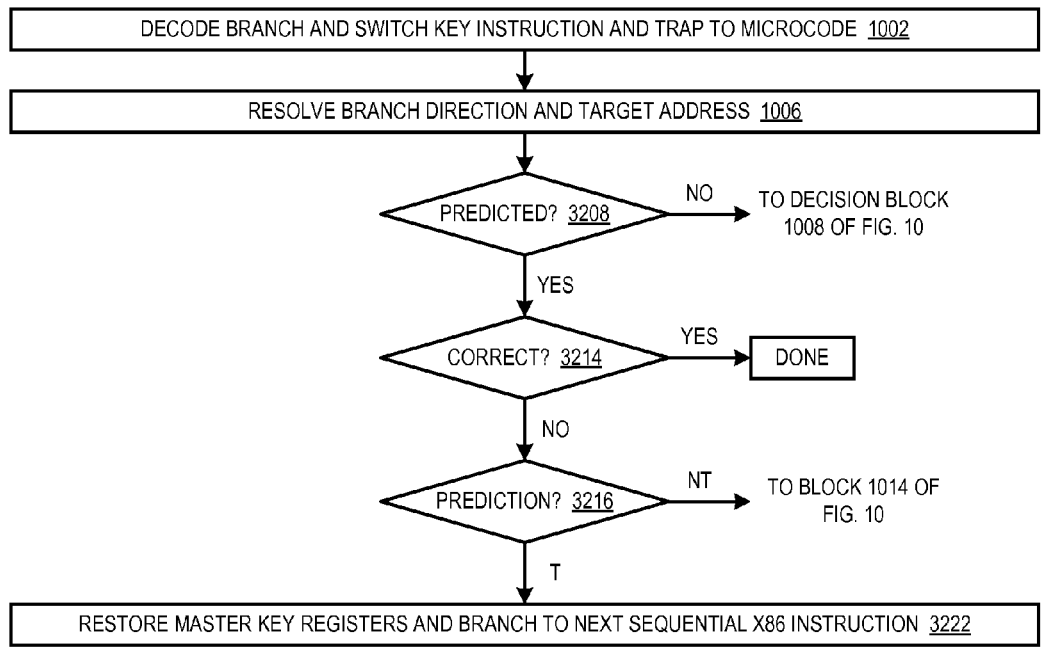
FIG. 32 is a flowchart illustrating operation of the microprocessor of FIG. 27 to perform a branch and switch key instruction according to the present invention.

At block 3002, the microprocessor 100 executes a branch and switch key instruction 900/1200, as described in more detail with respect to FIG. 32. Flow proceeds to block 3004.

At block 3004, the microprocessor 100 allocates an entry 2808 in the BTAC 2802 and populates the target address 2906, T/NT 2908, KRF index 2912, and type 2914 fields with the resolved direction, target address, key register file index 904/1304, and instruction type, respectively, of the executed branch and switch key instruction 900/1200 in order to cache the history of the executed branch and switch key instruction 900/1200. Flow ends at block 3004.

Figure 31:
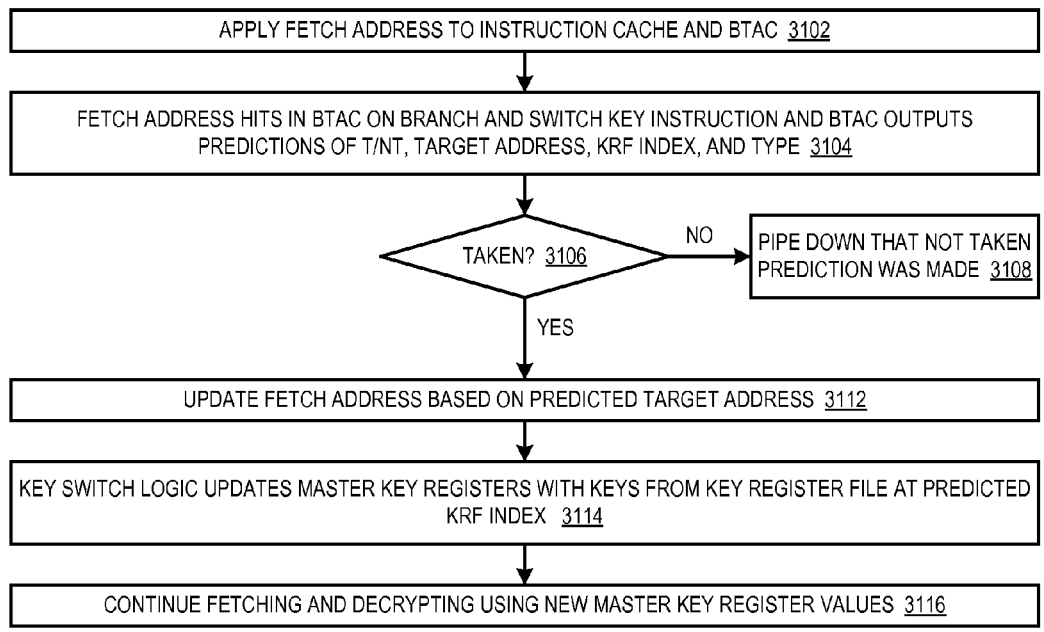
FIG. 31 is a flowchart illustrating operation of the microprocessor of FIG. 27 including the BTAC of FIG. 28 according to the present invention.

Referring now to FIG. 31, a flowchart illustrating operation of the microprocessor 100 of FIG. 27 including the BTAC 2802 of FIG. 28 according to the present invention is shown. Flow begins at block 3102.

At block 3102, the fetch address 134 is applied to the instruction cache 102 and to the BTAC 2802. Flow proceeds to block 3104.

At block 3104, the fetch address 134 hits in the BTAC 2802 and the BTAC 2802 outputs the values of the target address 2906, T/NT 2908, key register file index 2912, and type 2914 fields of the hitting entry 2808 on the target address 2706, T/NT 2708, KRF index 2712, and type 2714 outputs, respectively. In particular, the type field 2914 indicates a branch and switch key instruction 900/1200. Flow proceeds to decision block 3106.

At decision block 3106, the key switch logic 2712 determines whether the branch and switch key instruction 900/1200 is predicted taken by the BTAC 2802 by examining the T/NT output 2708. If the T/NT output 2708 indicates the branch and switch key instruction 900/1200 is taken, flow proceeds to block 3112; otherwise, flow proceeds to block 3108.

At block 3108, the microprocessor 100 pipes down along with the branch and switch key instruction 900/1200 an indication that a not taken prediction was made by the BTAC 2802. (Additionally, if the T/NT output 2708 indicates the branch and switch key instruction 900/1200 is taken, at block 3112 the microprocessor 100 pipes down along with the branch and switch key instruction 900/1200 an indication that a taken prediction was made by the BTAC 2802.) Flow ends at block 3108.

At block 3112, the fetch address generator 164 updates the fetch address 134 based on the predicted target address 2706 made by the BTAC 2802 at block 3104. Flow proceeds to block 3114.

At block 3114, the key switch logic 2712 updates the master key registers 142 with the values from the key register file 124 at the predicted key register file index 2712 made by the BTAC 2802 at block 3104. In one embodiment, the key switch logic 2712 stalls the fetch unit 104 from fetching blocks of instruction data 106, if necessary, until the master key registers 142 are updated. Flow proceeds to block 3116.

At block 3116, the fetch unit 104 continues fetching and decrypting instruction data 106 using the new master key register 142 values loaded at block 3114. Flow ends at block 3116.

Referring now to FIG. 32, a flowchart illustrating operation of the microprocessor 100 of FIG. 27 to perform a branch and switch key instruction 900/1200 according to the present invention is shown. The flowchart of FIG. 32 is similar in some ways to the flowchart of FIG. 10 and like-numbered blocks are similar. Although FIG. 32 is described with respect to FIG. 10, the method may also be used with respect to the operation of the branch and switch key instruction 1200 of FIG. 14. Flow begins at block 1002.

At block 1002, the decode unit 108 decodes a branch and switch key instruction 900/1200 and traps to the microcode routine in the microcode unit 132 that implements the branch and switch key instruction 900/1200. Flow proceeds to block 1004.

At block 1006, the microcode resolves the branch direction (i.e., taken or not taken) and target address. Flow proceeds to decision block 3208.

At decision block 3208, the microcode determines whether the BTAC 2802 made a prediction for the branch and switch key instruction 900/1200. If so, flow proceeds to decision block 3214; otherwise, flow proceeds to block 1008 of FIG. 10.

At decision block 3214, the microcode determines whether the BTAC 2802 prediction was correct by comparing the piped down BTAC 2802 T/NT 2708 and target address 2706 predictions with the direction and target address resolved at block 1006. If the BTAC 2802 prediction was correct, flow ends; otherwise, flow proceeds to decision block 3216.

At decision block 3216, the microcode determines whether the incorrect BTAC 2802 prediction was taken or not taken. If taken, flow proceeds to block 3222; otherwise, flow proceeds to block 1014 of FIG. 10.

At block 3222, the microcode restores the master key registers 142 since they were loaded with incorrect values at block 3114 of FIG. 31 due to an incorrect prediction of a taken branch and switch key instruction 900/1200 by the BTAC 2802. In one embodiment, the key switch logic 2712 includes storage and logic for restoring the master key registers 142. In one embodiment, the microcode generates an exception to an exception handler to restore the master key registers 142. Additionally, the microcode causes the microprocessor 100 to branch to the next sequential x86 instruction after the branch and switch key instruction 900/1200, which causes all x86 instructions in the microprocessor 100 to be flushed that are newer than the branch and switch key instruction 900/1200 and which causes all micro-ops in the microprocessor 100 to be flushed that are newer than the micro-op that branches to the target address. This includes all instruction bytes 106 fetched from the instruction cache 102 that may be waiting in buffers of the fetch unit 104 to be decrypted and the decode unit 108 to be decoded. As a result of the branch to the next sequential instruction, the fetch unit 104 begins fetching and decrypting instruction data 106 from the instruction cache 102 using the restored set of key values loaded into the master key registers 142. Flow ends at block 3222.

In addition to the security advantages provided by the instruction decryption embodiments described above that are incorporated in the microprocessor 100, the present inventors have also developed recommended coding guidelines that can be used in conjunction with the embodiments described to weaken statistical attacks on encrypted x86 code based on analysis of actual x86 instruction usage.

First, because an attacker will likely assume all 16 bytes of fetched instruction data 106 are x86 instructions, the code should have "holes" in the 16-byte blocks relative to program execution flow. That is, the code should include instructions to jump around some of the instruction bytes to create holes of unexecuted bytes that can be filled with appropriate value to increase the entropy of the plaintext bytes. Additionally, the code can use immediate data values wherever possible if doing so increases the entropy of the plaintext. Additionally, the immediate data values may be chosen to give false clues as to the locations of instruction opcodes.

Second, the code may include special NOP instructions that contain "don't care" fields with appropriate values to increase entropy. For example, the x86 instruction 0x0F0D05xxxxxxxx is a seven-byte NOP where the last four bytes can be any value. There are other forms with different opcodes and differing numbers of don't care bytes.

Third, many x86 instructions have the same basic function as other x86 instructions. Where there are equivalent-function instructions, the code may employ multiple forms instead of reusing the same instruction and/or use the form that increases the plaintext entropy. For example, the instructions 0xC10107 and 0xC10025 do the same thing. Finally, some equivalent-function instructions have different length versions, such as 0xEB22 and 0xE90022; thus, the code may employ multiple differing-length equivalent-function instructions.

Fourth, the x86 architecture allows the use of redundant or meaningless opcode prefixes that the code may carefully employ to further increase the entropy. For example, the instructions 0x40 and 0x2627646567F2F340 mean exactly the same thing. Because there are only eight "safe" x86 prefixes, they must be sprinkled into the code carefully to avoid making their frequency too high.

Although embodiments have been described in which the key expander performs a rotate and add/subtract function on a pair of master key register values, other embodiments are contemplated in which the key expander performs a function on more than two master key register values; additionally, the function may be different than the rotate and add/subtract function. Furthermore, embodiments of the switch key instruction 600 of FIG. 6 and the branch and switch key instruction 900 of FIG. 9 are contemplated in which the new key values are loaded into the master key register file 142 from the secure memory area 122 rather than from key register file 124; and embodiments of the branch and switch key instruction 1500 of FIG. 15 are contemplated in which the index field 2104 is used to store an address in the secure memory area 122. Finally, although embodiments have been described in which the BTAC 2702 is modified to cache a KRF index for use with the branch and switch key instructions 900/1200, embodiments are contemplated in which the BTAC 2702 is modified to cache an SMA address for use with the branch and switch key instructions 1500.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   an architected register, having a bit; and
   a fetch unit;
   wherein the microprocessor is configured to save a value of the bit, in response to receiving a request to interrupt a currently executing program, wherein the bit indicates whether the currently executing program is encrypted or unencrypted;
   wherein the microprocessor is further configured to restore the saved value to the bit and to resume fetching the interrupted program as the currently executing program, in response to executing a return from interrupt instruction;
   wherein if the restored value of the bit is set, the microprocessor is configured to restore decryption key values associated with the currently executing program, prior to resuming fetching the interrupted program, and to decrypt fetched instructions thereof using the restored decryption key values;
   wherein to restore the decryption key values, the microprocessor is configured to load the decryption key values from a storage element to a register file, wherein the storage element is configured to store decryption key values associated with each of a plurality of encrypted programs;
   wherein if the restored value of the bit is clear, the microprocessor is configured to refrain from decrypting the fetched instructions of the currently executing program.

2. The microprocessor of claim 1, wherein the bit is a bit in a x86 architecture EFLAGS register.

3. The microprocessor of claim 1, wherein the microprocessor is configured to save the value of the bit to a stack in memory, wherein the microprocessor is configured to restore the saved value from the stack in memory to the bit.

4. A microprocessor, comprising:
   an architected register, having a bit; and
   a fetch unit;
   wherein the microprocessor is configured to save a value of the bit, in response to receiving a request to interrupt a currently executing program, wherein the bit indicates whether the currently executing program is encrypted or unencrypted;
   wherein the microprocessor is further configured to restore the saved value to the bit and to resume fetching the interrupted program as the currently executing program, in response to executing a return from interrupt instruction;
   wherein if the restored value of the bit is set, the microprocessor is configured to restore decryption key values associated with the currently executing program, prior to resuming fetching the interrupted program, and to decrypt fetched instructions thereof using the restored decryption key values;
   wherein if the restored value of the bit is clear, the microprocessor is configured to refrain from restoring decryption key values and from decrypting the fetched instructions of the currently executing program;
   wherein to decrypt the fetched instructions using the restored decryption key values the microprocessor is configured to perform a Boolean exclusive-OR (XOR)

operation of the fetched instructions with a decryption key derived from the decryption key values; and wherein to refrain from decrypting the fetched instructions the microprocessor is configured to perform a Boolean exclusive-OR (XOR) operation of the fetched instructions with zeroes.

5. The microprocessor of claim 1, wherein the microprocessor is further configured to execute system software that receives a request to run a new encrypted program and, if insufficient free space in the storage element exists to store decryption key values for the new encrypted program, waits to run the new encrypted program until sufficient free space in the storage element exists.

6. A method for operating a microprocessor, the method comprising:
   saving a value of a bit of the microprocessor, in response to receiving a request to interrupt a currently executing program, wherein the bit indicates whether the currently executing program is encrypted or unencrypted;
   in response to executing a return from interrupt instruction, restoring the saved value to the bit and resuming fetching the interrupted program as the currently executing program;
   if the restored value of the bit is set, restoring decryption key values associated with the currently executing program, prior to said resuming fetching the interrupted program, and decrypting fetched instructions thereof using the restored decryption key values;
   wherein said restoring decryption key values comprises loading the decryption key values from a storage element to a register file, wherein the storage element is configured to store decryption key values associated with each of a plurality of encrypted programs; and
   if the restored value of the bit is clear, refraining from decrypting the fetched instructions of the currently executing program.

7. The method of claim 6, wherein the bit is a bit in a x86 architecture EFLAGS register.

8. The method of claim 6, wherein said saving the value of the bit comprises saving the value of the bit to a stack in memory, wherein said restoring the saved value to the bit comprises restoring the saved value from the stack in memory to the bit.

9. The method of claim 6, further comprising:
   receiving a request to run a new encrypted program; and
   if insufficient free space in the storage element exists to store decryption key values for the new encrypted program, waiting to run the new encrypted program until sufficient free space in the storage element exists.

10. A method for operating a microprocessor, the method comprising:
   saving a value of a bit of the microprocessor, in response to receiving a request to interrupt a currently executing program wherein the bit indicates whether the currently executing program is encrypted or unencrypted;
   in response to executing a return from interrupt instruction, restoring the saved value to the bit and resuming fetching the interrupted program as the currently executing program;
   if the restored value of the bit is set, restoring decryption key values associated with the currently executing program, prior to said resuming fetching the interrupted program, and decrypting fetched instructions thereof using the restored decryption key values;
   if the restored value of the bit is clear, refraining from restoring decryption key values and from decrypting the fetched instructions of the currently executing program;
   wherein said decrypting the fetched instructions using the restored decryption key values comprises performing a Boolean exclusive-OR (XOR) operation of the fetched instructions with a decryption key derived from the decryption key values; and
   wherein said refraining from decrypting the fetched instructions comprises performing a Boolean exclusive-OR (XOR) operation of the fetched instructions with zeroes.

* * * * *